United States Patent
Yao et al.

(10) Patent No.: US 11,234,149 B2
(45) Date of Patent: *Jan. 25, 2022

(54) OPERATIONS AND NOTIFICATIONS FOR PERFORMANCE MANAGEMENT OF 5G NETWORKS AND NETWORK SLICING

(71) Applicant: APPLE INC., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,446

(22) Filed: May 9, 2019

(65) Prior Publication Data

US 2019/0335350 A1 Oct. 31, 2019

Related U.S. Application Data

(63) Continuation of application No. 16/396,312, filed on Apr. 26, 2019, now Pat. No. 11,051,195.

(60) Provisional application No. 62/665,917, filed on May 2, 2018, provisional application No. 62/665,926, filed on May 2, 2018.

(51) Int. Cl.
*H04W 24/10* (2009.01)
*H04W 84/04* (2009.01)

(52) U.S. Cl.
CPC .......... *H04W 24/10* (2013.01); *H04W 84/042* (2013.01)

(58) Field of Classification Search
CPC ..... H04L 41/5032; H04L 43/04; H04L 43/08; H04L 43/0882; H04W 24/02; H04W 24/08; H04W 24/10; H04W 84/042

USPC .......................... 370/230, 235, 252
See application file for complete search history.

(56) References Cited

U.S. PATENT DOCUMENTS

| | | | | |
|---|---|---|---|---|
| 2014/0226501 | A1* | 8/2014 | Zhou | H04W 24/10 370/252 |
| 2018/0132117 | A1* | 5/2018 | Senarath | H04W 24/02 |
| 2018/0262924 | A1* | 9/2018 | Dao | H04W 24/02 |
| 2019/0095510 | A1* | 3/2019 | Cruise | G06Q 10/10 |

OTHER PUBLICATIONS

Machine translation of WO2018127019 (Year: 2018).*

* cited by examiner

*Primary Examiner* — Harun Chowdhury
(74) *Attorney, Agent, or Firm* — Fay Kaplun & Marcin, LLP

(57) ABSTRACT

An apparatus of a management service producer comprises one or more processors to create a measurement job for one or more NFs, NSSIs, NSIs, networks or subnetworks by receiving a CreateMeasurementJob operation request for creating a measurement job for the one or more NFs, NSSIs, NSIs, networks or subnetworks from a consumer, checking if one or more new measurement types need to be collected for the one or more NFs or constituent NSSIs or constituent NFs, requesting the NFs or the management service producer of the constituent NSSIs or constituent NFs to collect the performance data when one or more new measurements types are to be collected for the one or more NFs or constituent NSSIs or constituent NFs. The management service producer allows the consumer to choose the reporting method from performance data file reporting and performance data streaming for the collected performance data in the CreateMeasurementJob operation request.

10 Claims, 14 Drawing Sheets

OPERATIONS AND NOTIFICATIONS FOR PERFORMANCE MANAGEMENT OF 5G NETWORKS AND NETWORK SLICING

CROSS-REFERENCE TO RELATED APPLICATIONS

The present application is a continuation of pending U.S. patent application Ser. No. 16/396,312 filed Apr. 26, 2019, entitled OPERATIONS AND NOTIFICATIONS FOR PERFORMANCE MANAGEMENT OF 5G NETWORKS AND NETWORK SLICING which in turn claims the benefit of U.S. Provisional Application No. 62/665,917 filed May 2, 2018 and the benefit of U.S. Provisional Application No. 62/665,926 filed May 2, 2018. Said application Ser. No. 16/396,312, said Application No. 62/665,917, and said Application No. 62/665,926 are hereby incorporated herein by reference in their entireties.

BACKGROUND

Definitions have not been provided for service based operations and notifications for performance management (PM) for Fifth Generation (5G) networks and network slicing. Definitions should be provided for the operations and/or notifications as part of management service component type A based on the SBA concepts set forth in the Third Generation Partnership Project (3GPP) Technical Specification (TS) 28.533 for PM for 5G networks and network slicing. Definitions should also be provided for the procedures for measurement job control related management services for 5G networks and network slicing.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 21 illustrates an architecture of a system of a network in accordance with some embodiments.

FIG. 22 illustrates example components of a device in accordance with some embodiments.

FIG. 23 illustrates example interfaces of baseband circuitry in accordance with some embodiments.

Figure 1:
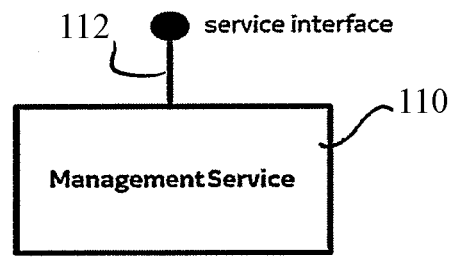
FIG. 1 is a diagram of a management service function in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1 is a diagram of a management service function in accordance with one or more embodiments will be discussed. For Fifth Generation (5G) networks and network slicing, network management is evolving towards a service based architecture. The general concepts of the management service are defined in Third Generation Partnership Project (3GPP) Technical Specification (TS) 28.533 as follows. Said 3GPP TS 28.533 is hereby incorporated herein by reference in its entirety. A management service 110 offers management capabilities. These management capabilities are accessed by management service consumers via a standardized service interface 112 composed of individually specified management service components.

There are several basic elements of a management function service based interface 112. Management service component type A is a group of management operations and/or notifications agnostic of managed entities. Management service component type B is the management information represented by information model of managed entities. Management service component type B includes the following models: Network resource model for Next Generation Radio Access Network (NG-RAN) and New Radio (NR) and 5G Core (5GC) as defined in 3GPP TS 28.541 which is incorporated herein by reference in its entirety. Management service component type C is performance information of the managed entity and fault information of the managed entity. Management service component type C includes the following information: alarm information as defined in 3GPP TS 28.545 and performance data as defined in 3GPP TS 28.552, 3GPP TS 28.554, and 3GPP TS 32.425. Said 3GPP TS 28.545, 3GPP TS 28.552, 3GPP TS 28.554, and 3GPP TS 32.425 are hereby incorporated herein by reference in their entireties. Management service component type C could be combined with Management service component type B.

Figure 2:
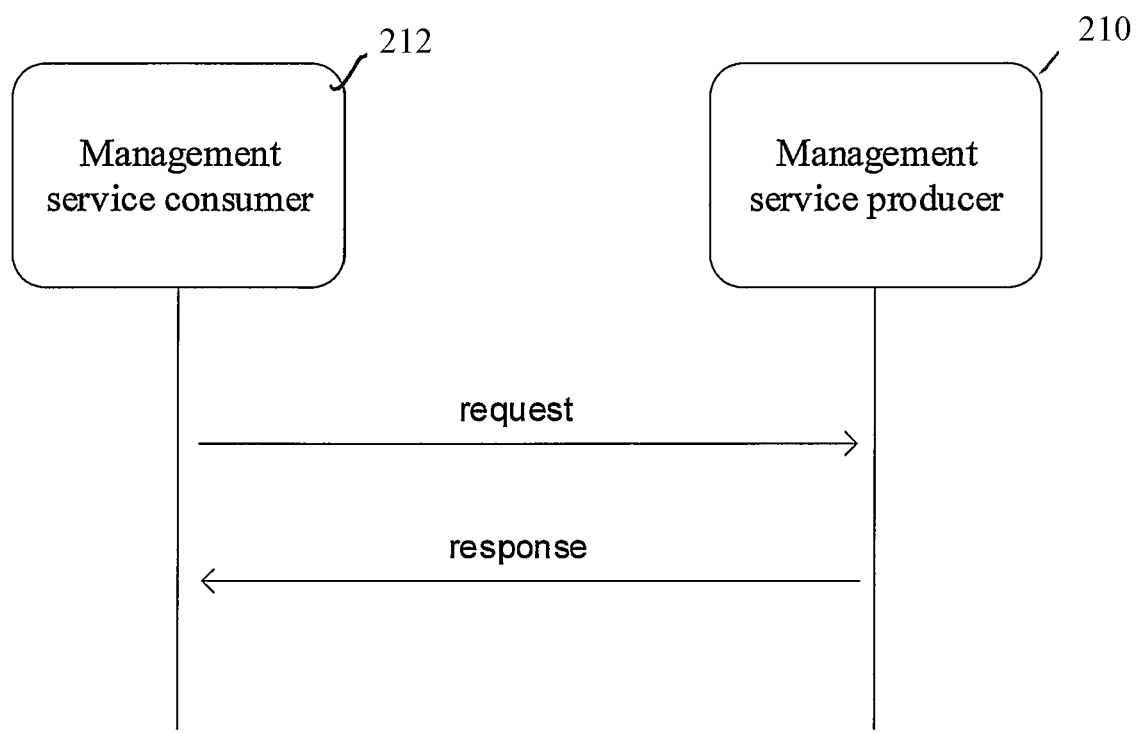
FIG. 2 is a diagram of a request-response communication paradigm in accordance with one or more embodiments.
Figure 3:
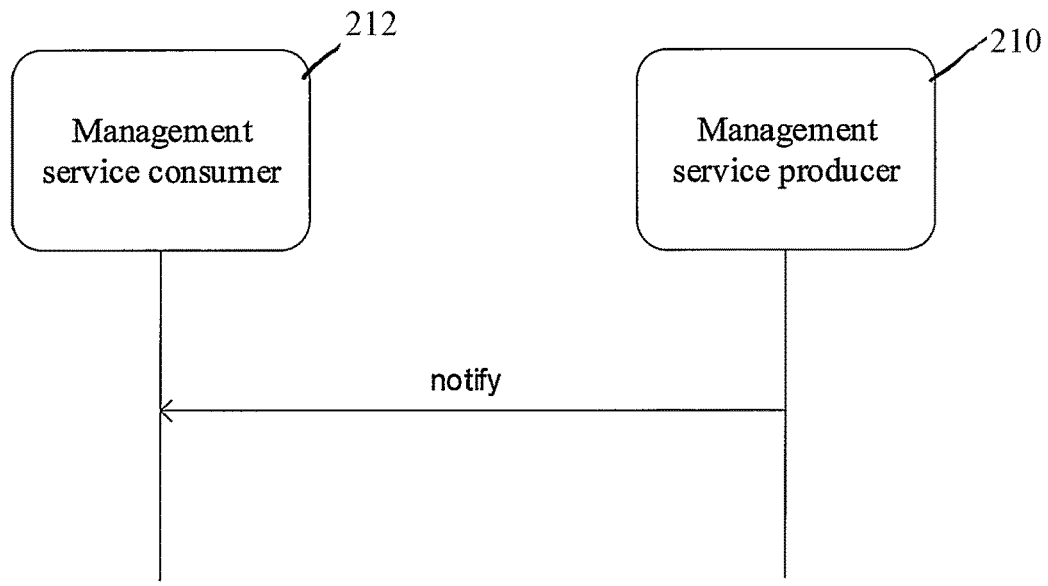
FIG. 3 is a diagram of a notify communication paradigm in accordance with one or more embodiments.

FIG. 2 is a diagram of a request-response communication paradigm in accordance with one or more embodiments will be discussed. Interactions between a management service producer 210 and a management service consumer 212 follow one of the two following paradigms. The first paradigm is shown in FIG. 2, and the second paradigm is shown in FIG. 3. In a "Request-response" paradigm as shown in FIG. 2, management service producer 210 is requested by a management service consumer 212 to invoke an operation, which either performs an action or provides information or both. The management service producer 210 provides a response based on the request by management service consumer 212.

FIG. 3 is a diagram of a notify communication paradigm in accordance with one or more embodiments will be discussed. In a "notify" paradigm as shown in FIG. 3, the management service producer 210 notifies one or more management service consumers 212 when needed. The use cases and requirements for performance management (PM) for 5G networks and network slicing have been defined in 3GPP TS 28.550 which is incorporated herein by reference in its entirety. As discussed herein, one or more embodiments provide the definitions of operations and notifications as part of management service component type A based on the above-mentioned concepts to support the use cases and requirements.

Figure 4:
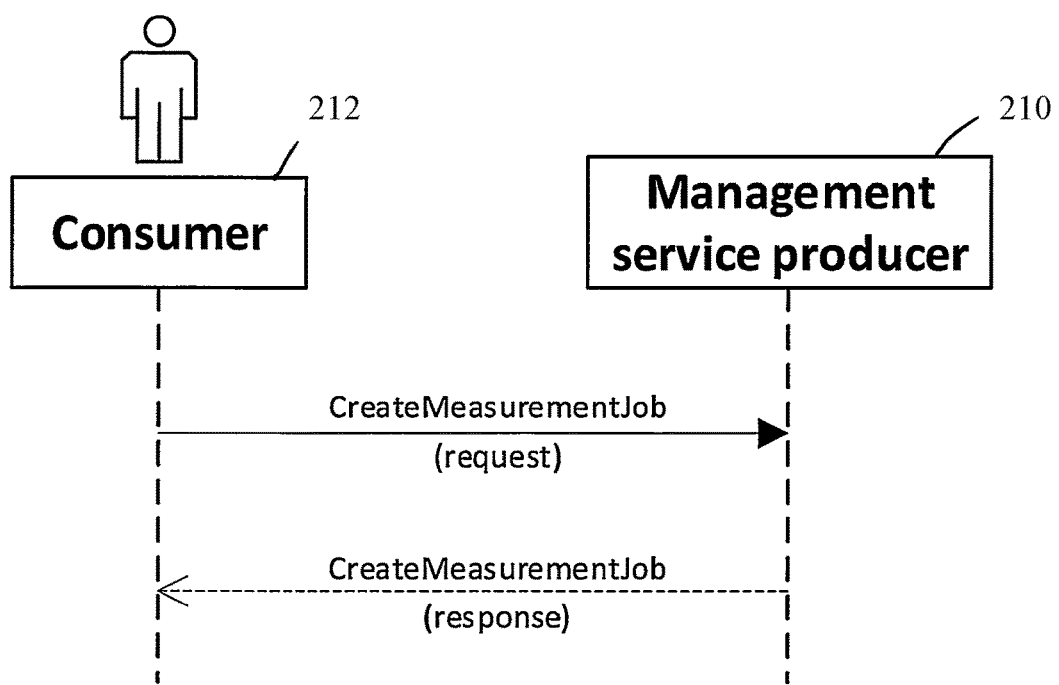
FIG. 4 is a diagram of a request to create a measurement job in accordance with one or more embodiments.

FIG. 4 is a diagram of a request to create a measurement job in accordance with one or more embodiments will be discussed. The operations and/or notifications for performance management (PM) for 5G networks and network slicing are defined herein below. Note that the operations, notifications and the parameters can be named differently, and the scope of the disclosed subject matter is not limited in these respects. The present disclosure is focused on the functionality rather than the name of the operations and the notifications, that is what the operations and notification can do, including the information rather than the parameter name that needs to be carried by the operations and notifications. Measurement job management related operations include an Operation createMeasurementJob (M). This operation supports the authorized consumer 212 to request the management service producer 210 to create a measurement job. One measurement job can collect the value of one or multiple measurement types. The measurement types are the performance data type defined in 3GPP TS 28.552 which is incorporated herein by reference in its entirety. When a measurement type is collected by one measurement job for a given instance, for example a network function (NF) instance, another measurement job creation request which wants to collect the same measurement type for the same instance with different granularity period may be rejected. This behavior can be consistent for a given implementation by a specific management service producer. The following tables, below, indicate the input parameters, the output parameters, and the exceptions for Operation createMeasurementJob.

TABLE 1

| Input parameters | | | |
| --- | --- | --- | --- |
| Parameter Name | Qualifier | Information type | Comment |
| iOCName | M | The IOC name defined of the NRMs (e.g., as defined in TS 28.541 [a], or the class name defined locally in the performance measurements specifications (e.g., TS 28.552 [x]). | It specifies one object class name. The consumer requests to collect one or more measurement type(s) of the instances of this class. |

TABLE 1-continued

Input parameters

| Parameter Name | Qualifier | Information type | Comment |
|---|---|---|---|
| iOCInstanceList | M | List of DN | It specifies the list of DNs of object instances whose measurement type(s) are to be collected. An empty list means that all instances (including the instances exist at the time of measurement job creation, and the instances added later) known by the management service producer shall be monitored. |
| measurementCategoryList | M | List of measurement type name (see TS 28.552 [x]). | It specifies the measurement type(s) to be measured. The element of measurementCategoryList shall be one of the following: The form "family.measurementName.subcounter" can be used in order to retrieve a specified subcounter of a measurement type. The form "family.measurementName" can be used in order to retrieve a specific measurement type. In case the measurement type includes subcounters, all subcounters will be retrieved. The form "family" can be used in order to retrieve all measurement types in this family. |
| granularityPeriod | M | The period between two successive measurements. | The management service producer will read the value of measurement type(s) at the end of each granularityPeriod. If the reporting method is performance data file reporting, the value can be 5 minutes, 15 minutes, 30 minutes, 1 hours, 12 hours and 24 hours. The measurement type collecting times are determined by the following rules. If the value is 5 minutes, then read on every 5th minute of the hour. If the value is 15 minutes, then read on every 15th minute of the hour. If the value is 30 minutes, then read on every 30th minute of the hour If the value is 1 hour, then read on every hour of the day If the value is 12 hours, then the first read shall be as soon as possible on the hour and subsequent reads shall be at 12 hours interval. If the value is 24 hours, then the first read shall be as soon as possible on the hour and subsequent reads shall be at 24 hours interval. If the reporting method is performance data streaming, the value of granularityPeriod could be shorter than 5 minutes and can be in seconds. |
| reportingMethod | M | The reporting method of the collected performance data, i.e., by performance data file reporting, or by performance data streaming. | It specifies the collected performance data are to be reported by either performance data file or performance data streaming. |
| reportingPeriod | M | The period between two successive performance data reporting. | The performance data report(s) are produced when the reporting period arrives. If the reportingMethod is performance data file reporting: The reportingPeriod shall be one or multiple of granularityPeriod. The measurement value of each granularityPeriod will be made available to the performance data reporting related service producer, who will prepare the performance data file(s) for each reportingPeriod. If the consumer has subscribed to the notifyFileReady and notifyFilePreparationError notifications from the performance data reporting related service producer, the consumer will receive the notifications about the result of the performance data file preparation from that producer with the interval as defined by reportPeriod; If the reportingMethod is performance data streaming: |

TABLE 1-continued

Input parameters

| Parameter Name | Qualifier | Information type | Comment |
|---|---|---|---|
| | | | The reportingPeriod shall be submultiple or one of granularityPeriod. The minimum reportingPeriod is 1 minute. In case the reportingPeriod is the submultiple of the granularityPeriod, the management service producer will read the interim measurement value has reached at the end of each reportingPeriod for the measurement type(s). The measurement value (including the interim measurement value if the reportingPeriod is the submultiple of the granularityPeriod) of each reportingPeriod will be made available to the performance data reporting related service producer, who will prepare the performance data stream for each reportingPeriod. If the consumer has subscribed to the reportPerformanceDataStream notification from the performance data reporting related service producer, the consumer will receive the notifications from that producer with the interval as defined by reportPeriod. |
| startTime | O | It specifies the begin time from which the measurement job will be active. | All values that indicate valid timestamp. Default value is "start now". If startTime is in the past, the current time will be used and the job will start immediately. When a measurement job becomes active, it does not mean that the measurement job immediately monitors the measurement type(s). The consumer can set the detailed time frame (e.g. dailySchedule or weeklySchedule) by schedule parameter for a measurement job to monitor the measurement type(s). If there is no time frame scheduled, the measurement job immediately monitors the measurement types when it becomes active. |
| stopTime | O | It specifies the end time after which the measurement job will be stopped. | All values that indicate valid timestamp and shall be later than startTime and current time. This attribute may carry the value "indefinitely". Default value is to run indefinitely. |
| schedule | O | It specifies the detailed time frames (within the startTime and stopTime) during which the measurement job is active and monitors the measurement type(s). | Its value is only one of the following, dailyScheduling or weeklyScheduling. The legal values for them refer to ITU-T Recommendation X.721 [i]. The legal values for them are as follows. dailyScheduling: {{ intervalStart, {hour 0, minute 0} intervalEnd {hour 23, minute 59}}} weeklyScheduling: {{ daysOfWeek '111111'B, intervalsOfDay dailyScheduling}} Default value is "daily". |
| priority | O | It specifies the priority of measurement job | Its value should be one of the following: Low, Medium, High Default value is "Medium" |
| reliability | O | It specifies the reliability of measurement job | Its value is vendor specific. |

TABLE 2

Output parameters

| Parameter Name | Qualifier | Matching Information | Comment |
|---|---|---|---|
| jobId | M | It identifies the measurement job instance (and distinguishes it from all other ongoing and stopped | Unique identifier of the measurement job from all the ongoing and stopped Measurement jobs that have been created for the subject consumer. |

TABLE 2-continued

Output parameters

| Parameter Name | Qualifier | Matching Information | Comment |
|---|---|---|---|
| unsupportedList | M | measurement job instances that have been created for the subject consumer). List of < iOC instance, measurement type name, reason > | To create a measurement job, best-effort is required. The parameter of 'unsupportedList' must be returned if status = PartialSuccess. The reason can be any of: Measurement type name is unknown. Measurement type name is invalid. Measurement type name is not supported in the specific implementation. Measurement type name is already monitored for the IOC instance with a different granularityPeriod. The related IOC instance is unknown (e.g. it does not exist at the time of this operation invocation). Insufficient capacity to monitor the related IOC instance(s). |
| status | M | ENUM (Success, Failure, PartialSuccess) | An operation may fail because of a specified or unspecified reason. |

TABLE 3

Exceptions

| Exception Name | Definition |
|---|---|
| invalidStartTime | Condition: startTime is invalid. Returned Information: Name of the exception; status is set to 'Failure'. |
| invalidStopTime | Condition: stopTime is invalid. Returned Information: Name of the exception; status is set to 'Failure'. |
| invalidSchedule | Condition: schedule is invalid. Returned Information: Name of the exception; status is set to 'Failure'. |
| invalidReportingMethod | Condition: reportingMethod is invalid. Returned Information: Name of the exception; status is set to 'Failure'. |
| invalidGranularityPeriod | Condition: granularityPeriod is invalid. Returned Information: Name of the exception; status is set to 'Failure'. |
| invalidReportingPeriod | Condition: reportingPeriod is invalid. Returned Information: Name of the exception; status is set to 'Failure'. |
| highWorkLoad | Condition: no sufficient capacity Returned Information: Name of the exception and the detailed reason which is one of: CpuBusy; DiskShortage, LowMemory, maxJobReached, otherReason; status is set to 'Failure'. |
| noValidMeasurementType | Condition: all measurement type names are invalid (i.e., none of the measurement type names are valid). Returned information: output parameter status is set to 'Failure'. |
| invalidPriority | Condition: priority is invalid. Returned Information: Name of the exception; status is set to 'Failure'. |
| invalidReliability | Condition: reliability is invalid. Returned Information: Name of the exception; status is set to 'Failure'. |

Figure 5:
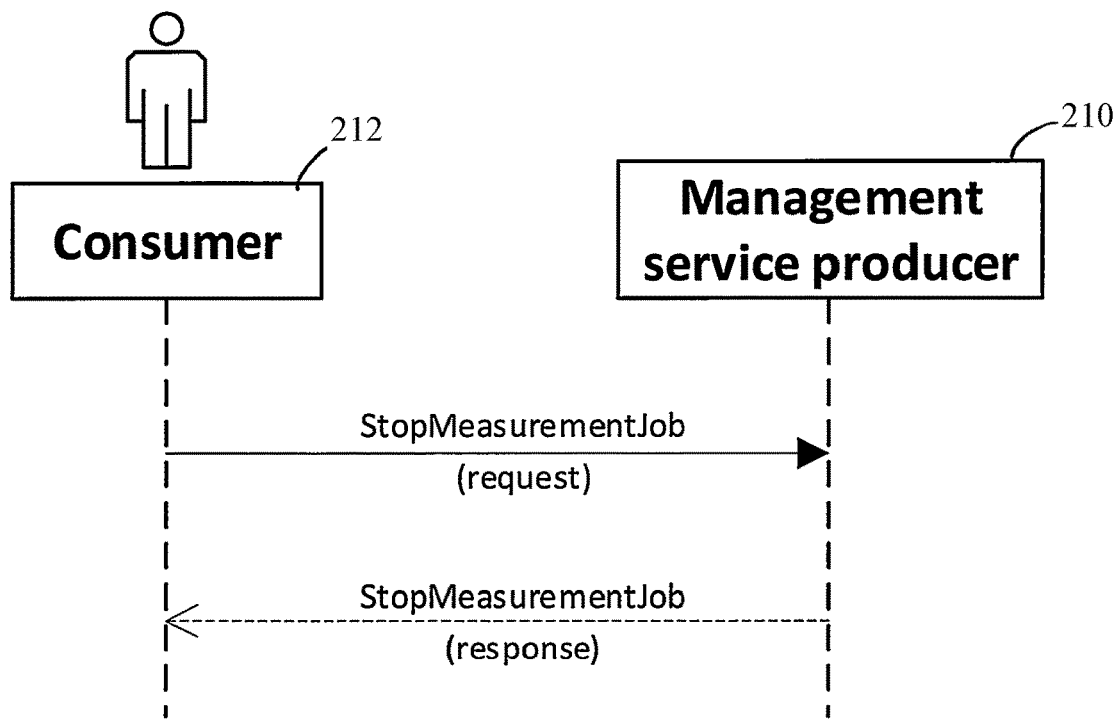
FIG. 5 is a diagram of a request to stop a measurement job in accordance with one or more embodiments.

FIG. 5 is a diagram of a request to stop a measurement job in accordance with one or more embodiments will be discussed. FIG. 5 shows the Operation stopMeasurementJob (M). This operation supports the authorized consumer to request the management service producer to terminate a measurement job. Whether the measurement job is removed from the management service producer 210 is vendor specific and out of scope of the present document. The measurement job could be stopped at the end of the granularityPeriod or immediately. After the job has been stopped, the performance data reporting related notification (i.e., notifyFileReady, notifyFilePreparationError or reportPerformanceDataStream) can be emitted, by the performance data reporting related service producer, immediately or when the next reporting period is reached. The following tables provide the input parameters, the output parameters, and the exceptions for the Operation stopMeasurementJob.

TABLE 4

Input parameters

| Parameter Name | Qualifier | Information type | Comment |
|---|---|---|---|
| jobId | M | See subclause 5.1.1.3 | It specifies the measurement job to be stopped. |

TABLE 5

Output parameters

| Parameter Name | Qualifier | Matching Information | Comment |
|---|---|---|---|
| Status | M | ENUM (Success, Failure) | An operation may fail because of a specified or unspecified reason. |

TABLE 6

Exceptions

| Exception Name | Definition |
|---|---|
| unknownJob | Condition: the jobId does not exist. Returned information: output parameter status is set to 'Failure'. |
| jobCannotBeStopped | Condition: the measurement job cannot be stopped. Returned information: output parameter status is set to 'Failure'. |

Figure 6:
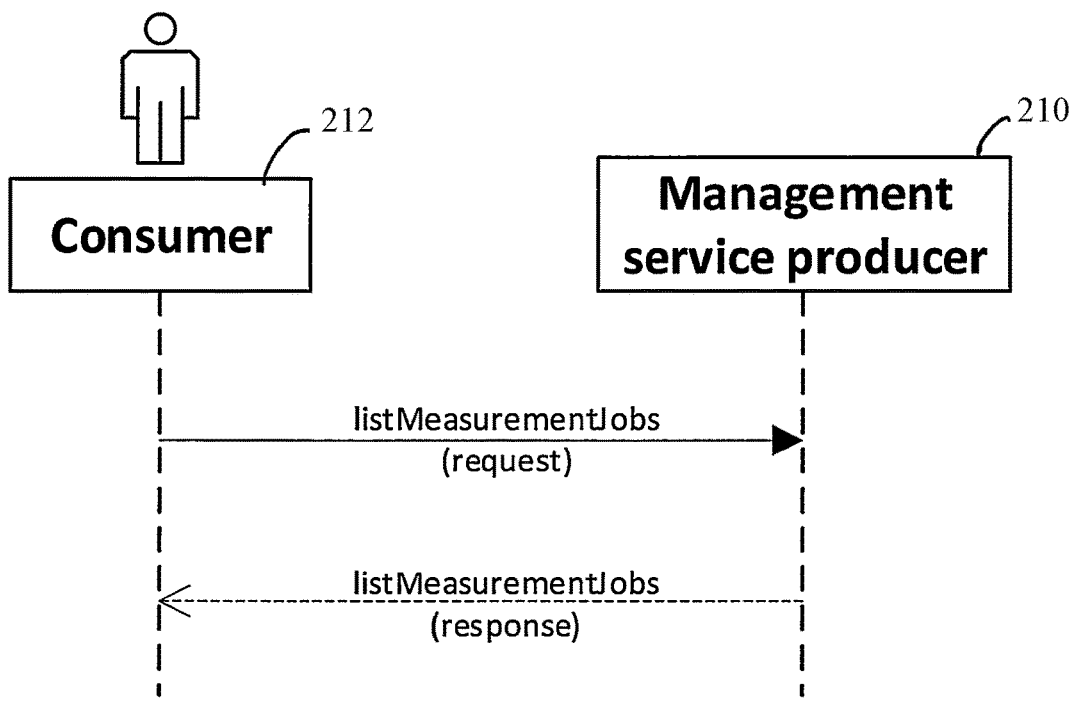
FIG. 6 is a diagram of a request to list measurement jobs in accordance with one or more embodiments.

FIG. 6 is a diagram of a request to list measurement jobs in accordance with one or more embodiments will be discussed. FIG. 6 shows the Operation listMeasurementJobs (M). This operation supports the authorized consumer 212 to request the measurement job management related service producer 210 to list the information of all or a set of specified ongoing measurement jobs. The management service producer 212 can provide the information about the ongoing measurement jobs that are created for the subject consumer. The following tables provide the input parameters, output parameters, and exceptions for Operation listMeasurementJobs.

TABLE 7

Input parameters

| Parameter Name | Qualifier | Information type | Comment |
|---|---|---|---|
| jobIdList | M | List of jobId of the measurement jobs | This parameter specifies the criteria to list the measurement jobs. If the parameter specifies the list of jobId to be retrieved, then the corresponding information of measurement jobs will be returned. If the parameter contains no information, all the measurement jobs created for the subject consumer are retrieved. |

TABLE 8

Output parameters

| Parameter Name | Qualifier | Matching Information | Comment |
|---|---|---|---|
| jobInfoList | M | List of <attributes (refer to input parameter of operation createMeasurementJob in clause 5.1.1.2) of measurement job: iOCName iOCInstanceList measurementCategoryList granularityPeriod reportingMethod reportingPeriod startTime stopTime schedule priority reliability > | Returned information of corresponding Measurement Jobs matching the input criteria. If no match, then the length of the jobInfolist will be 0 (with status == Success). If the measurement job is created using non-empty iOCInstanceList in createMeasurementJob, then iOCInstanceList here shall contain the DNs of the supported IOC instances. If the measurement job is created using empty iOCInstanceList, then iOCInstanceList here shall be empty as well. |
| status | M | ENUM (Success, Failure) | An operation may fail because of a specified or unspecified reason. |

TABLE 9

| Exception Name | Definition |
| --- | --- |
| | Exceptions |
| invalidJobIdList | Condition: jobIdList specified in the input parameter is valid.<br>Returned information: output parameter status is set to 'Failure'. |

Figure 7:
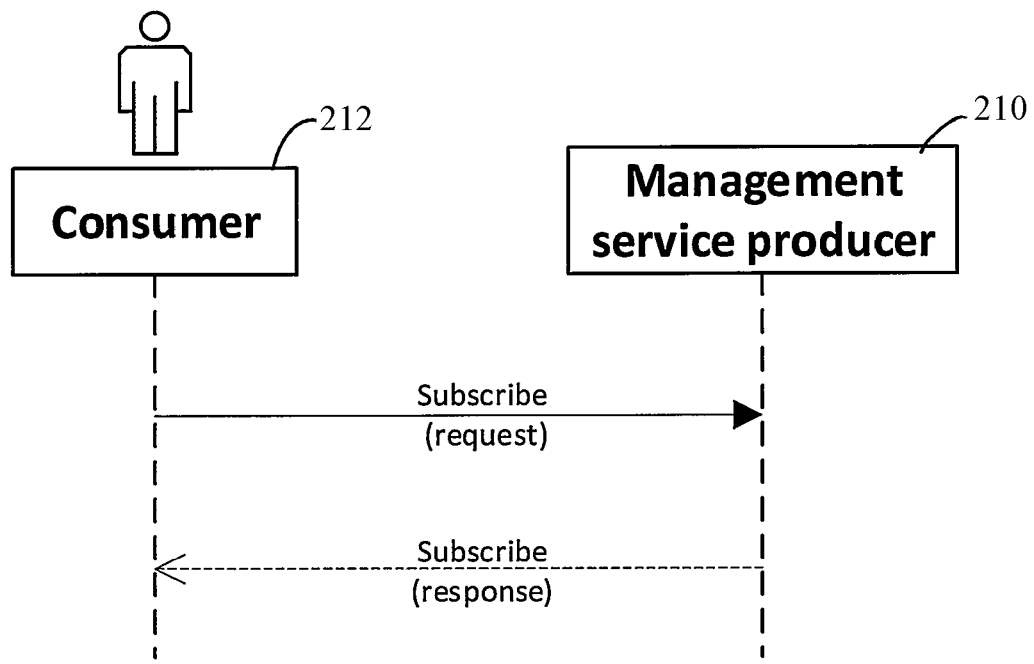
FIG. 7 is a diagram of a request to subscribe to a notification in accordance with one or more embodiments.

FIG. 7 is a diagram of a request to subscribe to a notification in accordance with one or more embodiments will be discussed. Notification subscription related operations can include Operation subscribe (M). This operation enables the authorized consumer 212 to subscribe to all kinds of notifications related to the services provided by the management service producer 210, for example performance data reporting related service producer, to the subject consumer 212. The following tables provide the input parameters, output parameters, and exceptions for Operation subscribe.

TABLE 10

Input parameters

| Parameter Name | Qualifier | Information Type | Comment |
| --- | --- | --- | --- |
| consumerReference | M | It specifies the reference of the consumer to which notifications shall be sent. | The format of the reference may have dependency on the solution set. |
| timeTick | O | It specifies the value of a timer hold by the management service producer for the subject consumer. The value is in unit of whole minute. | A special infinite value is assumed when parameter is absent or present but equal to zero. |
| filter | O | It specifies a filter constraint that management service producer shall use to filter notification(s). Filter constraint grammar is solution set dependent | If this parameter is absent, then no filter constraint shall be applied. |

TABLE 11

Output parameters

| Parameter Name | Qualifier | Matching Information | Comment |
| --- | --- | --- | --- |
| subscriptionId | M | An unambiguous identity of this subscription. | |
| status | M | ENUM (OperationSucceeded, OperationFailedExistingSubscription, OperationFailed) | If subscription is successfully created, status = OperationSuceeded.<br>If subscription is not created because it is duplicated or conflict with existing subscription(s), status = OperationFailedExistingSubscription<br>If the operation is failed for any other reason than being duplicated or conflict with existing subscription(s), status = OperationFailed. |

TABLE 12

Exceptions

| Name | Definition |
| --- | --- |
| operation_failed_existing_subscription | Condition: The subscription is duplicated or conflict with existing subscription(s)<br>Returned Information: The output parameter status |
| Operation_failed | Condition: The operation is failed for any other reason than being duplicated or conflict with subscription(s)<br>Returned Information: The output parameter status |

Figure 8:
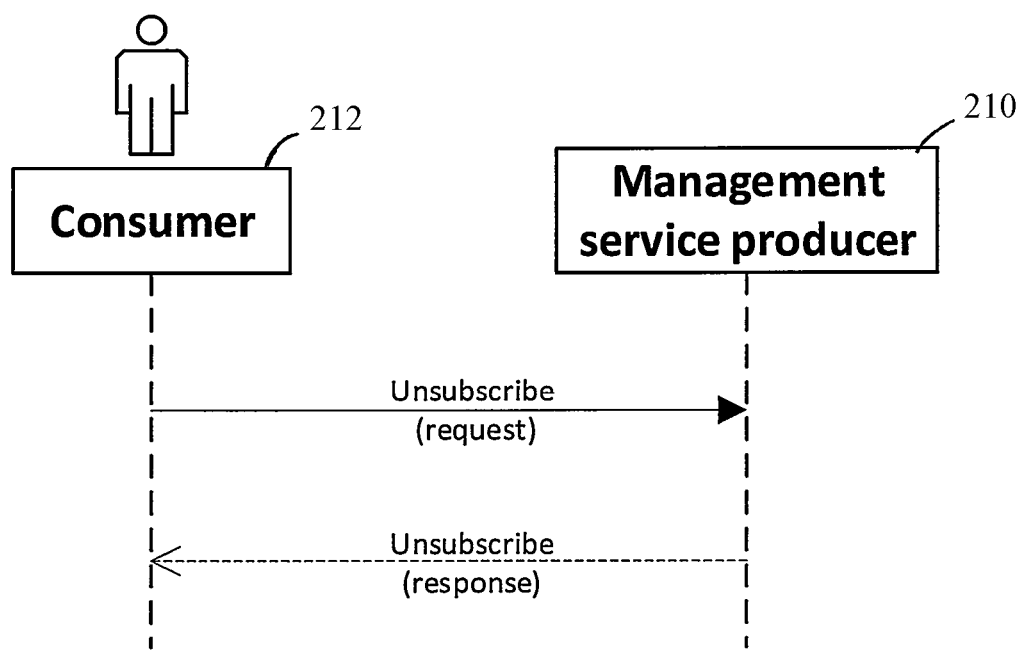
FIG. 8 is a diagram of a request to unsubscribe to a notification in accordance with one or more embodiments.

FIG. 8 is a diagram of a request to unsubscribe to a notification in accordance with one or more embodiments will be discussed. FIG. 8 shows Operation unsubscribe (M). This operation enables the authorized consumer 212 to cancel one or more subscriptions at a management service producer 210, for example performance data reporting related service producer. The consumer 212 can cancel one subscription made with a consumerReference by providing the corresponding subscriptionId or all subscriptions made with the same consumerReference by leaving the subscriptionId parameter absent. The following tables provide input parameters, output parameters, and exceptions for Operation unsubscribe.

TABLE 13

Input parameters

| Parameter Name | Qualifier | Information Type | Comment |
| --- | --- | --- | --- |
| consumerReference | M | It specifies the reference of the consumer whose subscription(s) are to be cancelled. | The format of the reference may have dependency on the solution set. |
| subscriptionId | O | It holds a subscriptionId carried as the output parameter in the subscribe operation. | If this parameter is absent, all subscriptions made with the same consumerReference shall be cancelled. |

TABLE 14

Output parameters

| Parameter Name | Qualifier | Matching Information | Comment |
| --- | --- | --- | --- |
| status | M | ENUM (OperationSucceeded, OperationFailed) | If subscription(s) as identified in the input parameter are cancelled, status = OperationSucceeded. If the operation is failed, status = OperationFailed. |

TABLE 15

Exceptions

| Name | Definition |
| --- | --- |
| Operation_failed | Condition: the operation is failed Returned Information: The output parameter status |

Figure 9:
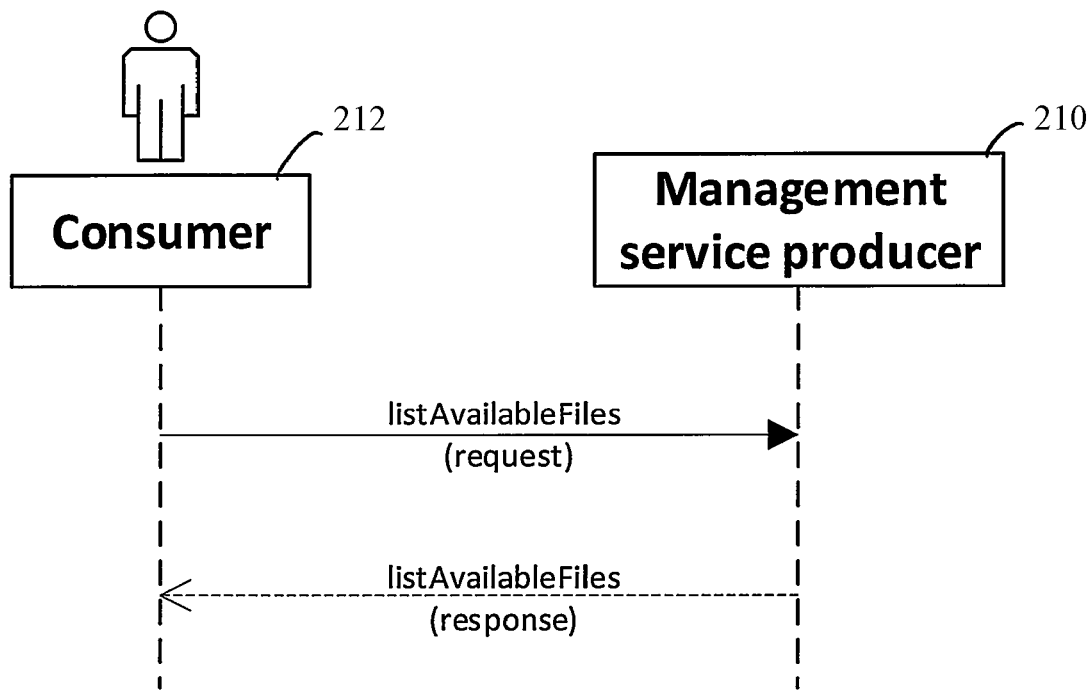
FIG. 9 is a diagram of a request to list available files in accordance with one or more embodiments.

FIG. 9 is a diagram of a request to list available files in accordance with one or more embodiments will be discussed. Performance data file listing related operations can include Operation listAvailableFiles (M). This operation allows the consumer 212 to list all or specified available management data files stored in the performance data reporting related service producer 210. The performance data reporting related service producer can provide the information about the available management data files that are created for the subject consumer. A Solution Set may choose to split this operation in several operations, for example operations to get "iterator" which fulfil the criteria and other operations to retrieve the detailed information of the files from the "iterator". The following tables provide input parameters, output parameters, and exceptions for Operation listAvailableFiles.

TABLE 16

Input parameters

| Parameter Name | Qualifier | Information type | Comment |
| --- | --- | --- | --- |
| managementDataType | M | | It specifies the type of the management data stored in the file. For performance data files, the value is assigned to "PM". |

TABLE 16-continued

Input parameters

| Parameter Name | Qualifier | Information type | Comment |
|---|---|---|---|
| beginTime | M | The consumer requests to list information about the available file(s) whose ready time(s) are later or equal to this time. This parameter is expressed in UTC time. | This parameter indicates date and time. If this parameter is empty, no restriction on begin time is applied on the file ready time. |
| endTime | M | The consumer requests to list information about the available file(s) whose ready time(s) are earlier than this time. This parameter is expressed in UTC time. | This parameter indicates date and time. If this parameter is empty, no restriction on end time is applied on the file ready time. |

TABLE 17

Output parameters

| Parameter Name | Qualifier | Matching Information | Comment |
|---|---|---|---|
| fileInfoList | M | See the fileInfoList defined in notifyFileReady notification (clause 5.x.2.2) | See the fileInfoList defined in notifyFileReady notification (clause 5.x.2.2) |
| status | M | ENUM (Success, Failure) | |

TABLE 18

Exceptions

| Exception Name | Definition |
|---|---|
| invalidTimes | Condition: Either beginTime or endTime is invalid. Returned information: output parameter status is set to Failure. |

Figure 10:
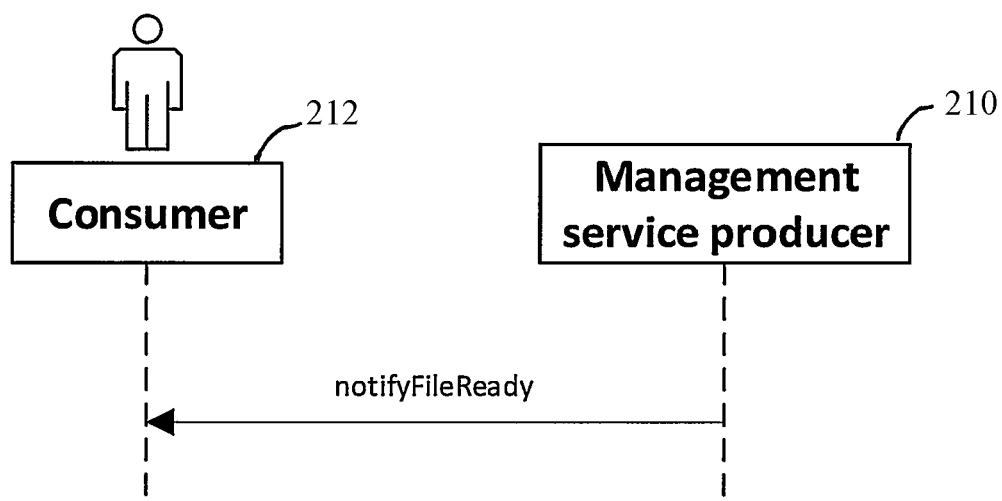
FIG. 10 is a diagram of a notification of a ready file in accordance with one or more embodiments.

FIG. 10 is a diagram of a notification of a ready file in accordance with one or more embodiments will be discussed. Performance data file reporting related notifications can include Notification notifyFileReady (M). This notification supports the authorized consumer 212 to be notified about the readiness of the performance data file, for example see annex A as discussed below for the performance data file definition, by the performance data reporting related service producer 210. After the performance data file has been prepared ready for the consumer(s), the performance data reporting related service producer 210 emits the notification to the subject one or more consumers who have subscribed to this notification. The following table provides notification information for the Notification notifyFileReady

TABLE 19

Notification information

| Parameter Name | Qualifier | Information Type | Comment |
|---|---|---|---|
| objectClass | M, Y | "PerformanceDataReportingServiceProducer" | It indicates the class, whose instance emitted this notification, is performance data reporting related service producer. |
| objectInstance | M, Y | Identifier of the performance data reporting related service producer | It identifies the performance data reporting related service producer actually emitting the notification. |
| notificationId | M, N | This is an identifier for the notification, which may be used to identify and correlate notifications. | The identifier of the notification shall be chosen to be unique across all notifications of a particular managed object instance throughout the time that |

TABLE 19-continued

Notification information

| Parameter Name | Qualifier | Information Type | Comment |
|---|---|---|---|
| | | | correlation is significant, it uniquely identifies the notification from other notifications generated by the subject performance data reporting related service producer. How identifiers of notifications are re-used to correlate notifications is outside of the scope of this specification. |
| eventTime | M, Y | It indicates the event occurrence time. | The semantics of Generalised Time specified by ITU-T shall be used here. |
| notificationType | M, Y | "notifyFileReady" | The type of notification, and it shall be assigned to "notifyFileReady" for this notification. |
| fileInfoList | M, N | List of struct < fileLocation, fileSize fileReadyTime fileExpirationTime fileCompression, fileFormat, >. Eech element is defined as following: fileLocation: It identifies the location of the file. The location may be a directory path or a URL. E.g.: "\\202.112.101.1\D:\user\performanceFiles\<xxx>" or "ftp://nms.telecom org.com/datastore/<xxx>, where <xxx> is the filename and the file naming convention is defined in Annex A.3. fileSize: It identifies the size of the file. Its value is positive Integer (the unit is byte). fileReadyTime: It identifies the date and time when the file was last closed and made available in the performance data reporting related service producer and the file content will not be changed. fileExpirationTime: It identifies the date and time beyond which the file may be deleted. It shall not be empty and shall be later than fileReadyTime. fileCompression: It identifies the name of the compression algorithm used for the file. An empty fileCompression means that there is no compression on the file. Choice of compression algorithm is vendor-specific but is encouraged to use industrial standard algorithm such as GZIP. fileFormat: It identifies the encoding technique used by the file. Its value should indicate the version of the file format specification plus to indicate if "ASN1" or "XML-schema" is used. | It specifies the information of each available file. |

TABLE 19-continued

| | | Notification information | |
|---|---|---|---|
| Parameter Name | Qualifier | Information Type | Comment |
| additionalText | O, N | It provides additional information for this notification. | It carries vendor-specific semantics not defined in the present document. |

Figure 11:
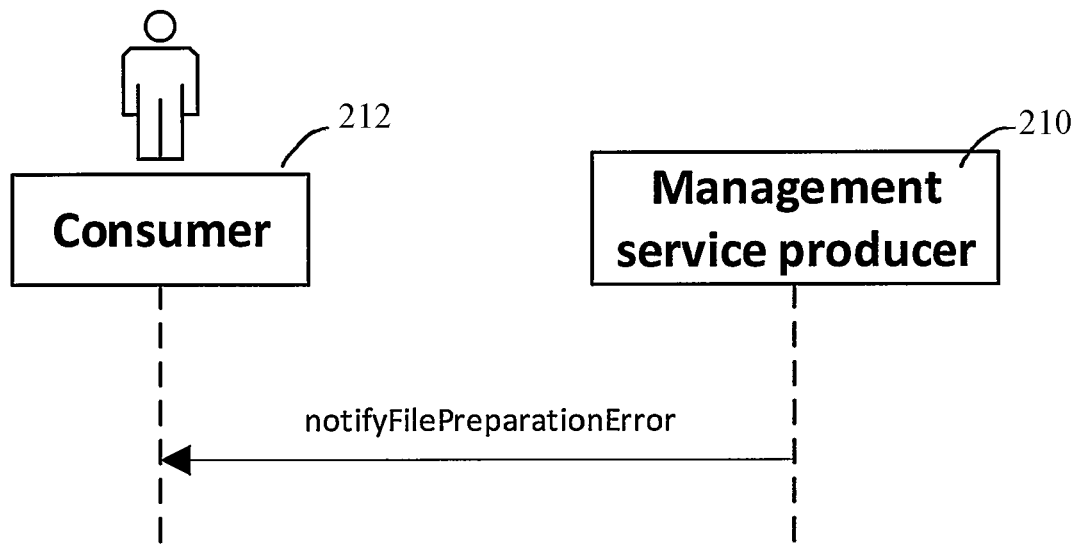
FIG. 11 is a diagram of a notification of the occurrence of an error in accordance with one or more embodiments.

FIG. 11 is a diagram of a notification of the occurrence of an error in accordance with one or more embodiments will be discussed. FIG. 11 shows the Notification notifyFilePreparationError (M). This notification supports the authorized consumer 212 to be notified about the occurrence of an error during the preparation of the performance data file. When such error occurs, the performance data reporting related service producer 210 emits the notification to the authorized one or more consumers 212 who have subscribed to this notification when the reporting period arrives. The following table provides the notification information for the Notification notifyFilePreparationError.

TABLE 20

| | | Notification information | |
|---|---|---|---|
| Parameter Name | Qualifier | Information Type | Comment |
| objectClass | M, Y | See Table 5.x.1.2. | See Table 5.x.1.2. |
| objectInstance | M, Y | See Table 5.x.1.2. | See Table 5.x.1.2. |
| notificationId | M, N | See Table 5.x.1.2. | See Table 5.x.1.2. |
| eventTime | M, Y | See Table 5.x.1.2. | See Table 5.x.1.2. |
| notificationType | M, Y | "notifyFilePreparationError" | The type of notification, and it shall be assigned to "notifyFilePreparationError" for this notification. |
| fileInfoList | M, N | See Table 5.x.1.2. | If file is kept, this parameter identifies the file whose preparation provoked an error. If file is not generated, this parameter is empty. |
| reason | M, N | It specifies the reason of the error occurred during the performance data file preparation. | The detailed reason is given, including errorInPreparation hardDiskFull hardDiskFailure tooManyFiles collectionTimeOut incompleteTruncatedFile corruptedFile lowMemory dataNotAvailable |
| additionalText | O, N | See Table 6.5.1.2. | See Table 6.5.1.2. |

Figure 12:
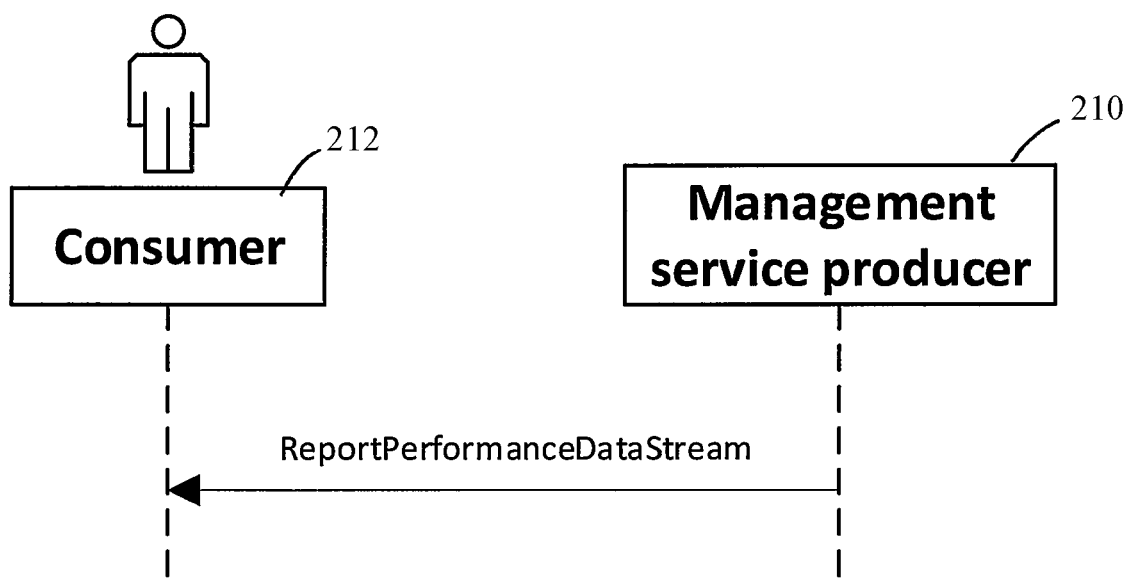
FIG. 12 is a diagram a data stream performance report in accordance with one or more embodiments.

FIG. 12 is a diagram of a data stream performance report in accordance with one or more embodiments will be discussed. Performance data streaming related notifications can include the Notification ReportPerformanceDataStream (M). This notification supports the authorized consumer 212 to receive the performance data streaming by notifications. When the reporting period arrives, the performance data reporting related service producer 210 emits the notification carrying the measurement result of a measurement job to the authorized one or more consumers 212 who have subscribed to this notification. The performance data reporting related service producer can emit the notifications related to the one or more measurement jobs created for the subject consumer. The following table provides the notification information for the Notification ReportPerformanceDataStream.

TABLE 21

| | | Notification information | |
|---|---|---|---|
| Parameter Name | Qualifier | Information Type | Comment |
| objectClass | M, Y | "PerformanceDataReportingServiceProducer" | It indicates the class, whose instance emitted this |

TABLE 21-continued

Notification information

| Parameter Name | Qualifier | Information Type | Comment |
| --- | --- | --- | --- |
| | | | notification, is performance data reporting related service producer. |
| objectInstance | M, Y | Identifier of the performance data reporting related service producer | It identifies the performance data reporting related service producer actually emitting the notification. |
| notificationId | M, N | This is an identifier for the notification, which may be used to identify and correlate notifications. | The identifier of the notification shall be chosen to be unique across all notifications of a particular managed object instance throughout the time that correlation is significant, it uniquely identifies the notification from other notifications generated by the subject performance data reporting related service producer. How identifiers of notifications are re-used to correlate notifications is outside of the scope of this specification. |
| eventTime | M, Y | It indicates the event occurrence time. | The semantics of Generalised Time specified by ITU-T shall be used here. |
| notificationType | M, Y | "ReportPerformanceDataStream" | The type of notification, and it shall be assigned to "ReportPerformanceDataStream" for this notification. |
| jobId | M, Y | It represents the measurement job with which the performance data stream is associated. | |
| collectionBeginTime | M, Y | The "collectionBeginTime" is a time stamp that refers to the start of the first measurement collection interval (granularity period) that is covered by the collected measurement results. | |
| measData | M, Y | List of structure <br>measTypes,<br>measObjInstId,<br>measTimeStamp,<br>measValues,<br>suspectFlag<br>>.<br>Each element is defined as following:<br>measTypes: This is the list of measurement types for which the following, analogous list of measurement values ("measValues") pertains. The measurement types for NR and NG-RAN, 5GC, NSI/NSSI, andnetwork/sub-network are specified in TS 28.552 [x].<br>measObjInstId: The "measObjInstId" field contains the full distinguished name (DN) of the measured object.<br>measTimeStamp: This tag carries the time stamp that refers to time that the measurement values were read for the collected measurement types. The minimum required information within timestamp is year, month, day, hour, minute, and second.<br>measvalues: This parameter contains the sequence of result values for the observed measurement types. The measValues sequence shall have the same number of elements, which follow the same order as the measTypes sequence. Normal values are INTEGERs and REALs. The NULL value is reserved to indicate that the measurement item is not applicable or could not be retrieved for the measured object instance.<br>suspectFlag: Used as an indication of quality of the reported data. FALSE in the case of reliable data, TRUE if not reliable. The default value is "FALSE", in case the suspect flag has its default value it may be omitted. | |
| additionalText | O, N | It provides additional information for this notification. | It carries vendor-specific semantics not defined in the present document. |

The following annex, Annex A, provide a definition for a performance data file.

Annex A: Performance Data File Definition

A.1 File Generation and Reporting

The measurement job control related service producer provides the measurement results (i.e., the value of the measurement type(s)) to the performance data reporting related service producer, and the performance data reporting related service producer generates the performance date file(s) for the consumer(s) and emits the "notifyFileReady" or "notifyFilePreparationError" notifications to the subject consumer(s) who have subscribed to these notifications.

How the measurement job control related service producer provides the measurement results to the performance data reporting related service producer is out of scope of the present specification. The performance data reporting related service producer shall be able to allow the consumer to access the file using the following file transfer protocols, and the performance data reporting related service producer shall always act server while the consumer shall always act as the initiator (client) of file transfer actions:

FTP;

SFTP.

A.2 Performance Data File Content Description

Table 22 lists all the file content items. It also provides an explanation of the individual items

TABLE 22

| File Content Description | |
|---|---|
| File Content Item | Description |
| measDataCollection | This is the top-level tag, which identifies the file as a collection of measurement data. The file content is made up of a header ("measFileHeader"), the collection of measurement result items ("measData"), and a measurement file footer ("measFileFooter"). |
| measFileHeader | This is the measurement result file header to be inserted in each file. It includes a version indicator, the name, type and vendor name of the sending service producer, and a time stamp ("collectionBeginTime"). |
| measData | The "measData" construct represents the sequence of zero or more measurement result items contained in the file. It can be empty in case no measurement data can be provided. The individual "measData" elements can appear in any order.<br>Each "measData" element contains the identifier of the measured entity ("measuredEntityId") and the list of measurement results pertaining to that measured entity ("measInfo"). |
| measFileFooter | The measurement result file footer to be inserted in each file. It includes a time stamp, which refers to the end of the overall measurement collection interval that is covered by the collected measurement results being stored in this file. |
| fileFormatVersion | This parameter identifies the file format version applied by the sender. The format version defined in the present document shall be the abridged number and version of this 3GPP document (see below).<br>The abridged number and version of a 3GPP document is constructed from its version specific full reference "3GPP [. . .] (yyyy-mm)" by:<br>removing the leading "3GPP TS"<br>removing everything including and after the version third digit, representing editorial only changes, together with its preceding dot character<br>from the resulting string, removing leading and trailing white space, replacing every multi character white space by a single space character and changing the case of all characters to uppercase. |
| senderName | The senderName uniquely identifies performance data reporting related service producer that assembled this measurement file. |
| senderType | This is a user configurable identifier of the type of management service producer that generated the file, e.g. performance data reporting related service producer. The string may be empty (i.e. string size = 0) in case the "senderType" is not configured in the sender. |
| vendorName | The "vendorName" identifies the vendor of the performance data reporting related service producer that provided the measurement file. The string may be empty (i.e. string size = 0) if the "vendorName" is not configured in the sender. |
| collectionBeginTime | The "collectionBeginTime" is a time stamp that refers to the start of the first measurement collection interval (granularity period) that is covered by the collected measurement results that are stored in this file. |
| measuredEntityId | The unique identification of the measured entity (such as NF, NSSI, NSI, PLMN) in the 3GPP system. The string may be empty (i.e. string size = 0) if the "measuredEntityId" is not configured in the CM applications. |
| measuredEntityUserName | This is the user definable name ("userLabel") defined for the measured object in 3GPP TS 28.622 [g]. The string may be empty (i.e. string size = 0) if the "measuredEntityUserName" is not configured in the CM applications. |
| measuredEntitySoftwareVersion | This is the software version ("swVersion") defined for the measured object in 3GPP TS 28.622 [g]. This is an optional parameter which allows post-processing systems to take care of vendor specific measurements modified between software versions. |
| measInfo | The sequence of measurements, values and related information. It includes a list of measurement types ("measTypes") and the corresponding results ("measValues"), together with the time stamp ("measTimeStamp") and granularity period ("granularityPeriod") pertaining to these measurements. |
| measInfoId | This attribute associates a tag name with the set of measurements defined by a measInfo property. This is an optional parameter that may be used to assign unique names to categories of measurements grouped together by measInfo elements. It allows parsing tools to easily isolate measurement sets by name. |

TABLE 22-continued

File Content Description

| File Content Item | Description |
| --- | --- |
| measTimeStamp | Time stamp referring to the end of the granularity period. |
| jobIdList | The "jobIdList" represents the measurement job(s) with which measurement result contained in the file is associated. There may be multiple job ids in case one file is supporting multiple measurement jobs created by different consumers respectively. |
| granularityPeriod | Granularity period of the measurement(s) in seconds. |
| reportingPeriod | Reporting period of the measurement(s) in seconds. |
| measTypes | This is the list of measurement types for which the following, analogous list of measurement values ("measValues") pertains.<br>The measurement types for NR and NG-RAN, 5GC, NSI/NSSI, and network/sub-network are specified in TS 28.552 [x]. |
| measValues | This parameter contains the list of measurement results for the resource being measured, e.g. trunk, cell. It includes an identifier of the resource ("measObjInstId"), the list of measurement result values ("measResults") and a flag that indicates whether the data is reliable ("suspectFlag"). |
| measObjInstId | The "measObjInstId" field contains the full distinguished name (DN) of the measured object. |
| measResults | This parameter contains the sequence of result values for the observed measurement types. The "measResults" sequence shall have the same number of elements, which follow the same order as the measTypes sequence. Normal values are INTEGERs and REALs. The NULL value is reserved to indicate that the measurement item is not applicable or could not be retrieved for the object instance. |
| suspectFlag | Used as an indication of quality of the scanned data. FALSE in the case of reliable data, TRUE if not reliable. The default value is "FALSE", in case the suspect flag has its default value it may be omitted. |
| timestamp | This tag carries the time stamp that refers to the end of the measurement collection interval (granularity period) that is covered by the collected measurement results that are stored in this file. The minimum required information within timestamp is year, month, day, hour, minute, and second. |

The measInfo contains the sequence of measurements, values and related information, in a table-oriented structure. The representation of all timestamps in PM files shall follow the representations allowed by the ISO 8601 [s]. The precise format for timestamp representation shall be determined by the technology used for encoding the PM file (e.g. ASN.1, XML DTD, and XML Schema). The choice of technology should ensure that this representation is derived from ISO 8601 [s]. Based on the representation used, the timestamp shall refer to either UTC time or local time or local time with offset from UTC.

A.3 File Naming Convention

A.3.1 Generic File Naming Convention

The following generic convention shall be applied for naming the files containing different management data:

<managementData_type><file_ready_date><
file_ready_time><file_expiration_delta_time>
[<specificData_extension>][<separator><RC>]

1) The managementData_type field is the type of the management data contained in the file, the value of managementData_type field including "PM" for performance data files, 2) The file_ready_date field is of the form YYYYMMDD, where:
YYYY is the year in four-digit notation;
MM is the month in two digit notation (01-12);
DD is the day in two digit notation (01-31).
The file_ready_date is the date when the file was last closed and made available for upload and the file content will not be changed.

3) The file_ready time field is of the form HHMMshhmm, where:
HH is the two digit hour of the day (local time), based on 24 hour clock (00-23);
MM is the two digit minute of the hour (local time, 00-59);

s is the sign of the local time differential from UTC (+ or −), in case the time differential to UTC is 0 then the sign may be arbitrarily set to "+" or "−";
hh is the two digit number of hours of the local time differential from UTC (00-23);
mm is the two digit number of minutes of the local time differential from UTC (00-59).

The file_ready time is the time when the file was last closed and made available for upload and the file content will not be changed.

4) To reduce length of the file name, the file_expiration_delta_time field could be a delta time interval from file ready time. The unit is hour.

5) The specificData_extension field is used to extend the extra file naming convention for a specific type of management data.

6) The RC parameter is a running count, starting with the value of "1", and shall be appended only if the filename is not unique, i.e. more than one file is generated and all other parameters of the file name are identical.

7) The separator field is "_-_", which is an underscore character (_), followed by a minus character (−), followed by an underscore character (_).

A.3.2 Performance Data File Specific Extension

The following convention defined as <specificData_extension> of the generic file naming convention (as defined annex A.3.1) shall be applied for performance data file naming:

<Type><Startdate>.<Starttime>-[<Enddate>.]<Endtime>[_-
<jobIdList>][_-<UniqueId>][_-_<RC>]

1) The Type field indicates if the file contains measurement results for single or multiple measured objects and/or granularity periods where:
"A" means single measured object, single granularity period (this is used when granularity period is equal to reporting period);

"B" indicates multiple measured objects, single granularity period (this is used when granularity period is equal to reporting period);

"C" signifies single measured object, multiple granularity periods (this is used when reporting period is multiples of the granularity period and will contain multiple measurement reports);

"D" stands for multiple measured objects, multiple granularity periods (this is used when reporting period is multiples of the granularity period and will contain multiple measurement reports).

2) The Startdate field indicates the date when the granularity period began if the Type field is set to A or B. If the Type field is either "C" or "D" then Startdate contains the date when the first granularity period of the measurement results contained in the file started. The Startdate field is of the form YYYYMMDD, where:

YYYY is the year in four-digit notation;
MM is the month in two digit notation (01-12);
DD is the day in two-digit notation (01-31).

3) The Starttime field indicates the time when the granularity period began if the Type field is set to A or B. If the Type field is either "C" or "D" then Starttime contains the time when the first granularity period of the measurement results contained in the file began. The Starttime field is of the form HHMMshhmm, where:

HH is the two-digit hour of the day (local time), based on 24-hour clock (00-23);
MM is the two digit minute of the hour (local time), possible values are 00, 05, 10, 15, 20, 25, 30, 35, 40, 45, 50, and 55;
s is the sign of the local time differential from UTC (+ or −), in case the time differential to UTC is 0 then the sign may be arbitrarily set to "+" or "−";
hh is the two-digit number of hours of the local time differential from UTC (00-23);
mm is the two digit number of minutes of the local time differential from UTC (00-59).

4) The Enddate field shall only be included if the Type field is set to "C" or "D", i.e. measurement results for multiple granularity periods are contained in the file. It identifies the date when the last granularity period of these measurements ended, and its structure corresponds to the Startdate field.

5) The Endtime field indicates the time when the granularity period ended if the Type field is set to A or B. If the Type field is either "C" or "D" then Endtime contains the time when the last granularity period of the measurement results contained in the file ended. Its structure corresponds to the Starttime field, however, the allowed values for the minute of the hour are 05, 10, 15, 20, 25, 30, 35, 40, 45, 50, 55, and 00.

6) UniqueId. This is the DN of the measured NF, NSI, NSSI, or network/subnetwork, as defined in annex A.2 (e.g. a measObjInstId). The field may be omitted only if the distinguishedName is not available from the CM applications.

7) The RC parameter is a running count, starting with the value of "1", and shall be appended only if the filename is otherwise not unique, i.e. more than one file is generated and all other parameters of the file name are identical. Therefore it may only be used by the EM, since the described situation cannot occur with NE generated files. Note that the delimiter for this field, _−_, is an underscore character (_), followed by a minus character (−), followed by an underscore character (_).

8) jobIdList indicates the measurement job id(s) that the performance data file is associated with.

Some examples describing file-naming convention:

1) file name: A20000626.2315+0200-2330+0200_gNBId, meaning: file produced for gNB <gNBId> on Jun. 26, 2000, granularity period 15 minutes from 23:15 local to 23:30 local, with a time differential of +2 hours against UTC.

2) file name: B20021224.1700-1130-1705-1130_-job10_S-NSSAI, meaning: file containing results for multiple measured objects, generated for measurement job job10, produced for NSI <S-NSSAI> on Dec. 24, 2002, granularity period 5 minutes from 17:00 local to 17:05 local, with a time differential of −11:30 hours against UTC.

3) file name: D20050907.1030+0000-20050909.1500+0000_SubnetworkId_−_2, meaning: file containing results subnetwork <SubnetworkId>, start of first granularity period 7 Sep. 2005, 10:30 local, end of last granularity period 9 Sep. 2005, 15:00 local, with a time differential of 0 against UTC. This is the second file for this subnetwork/granularity period combination.

4) file name: C20050907.1030+0000-20050909.1500+0000 gNBId, meaning: file produced for the gNB <gNBId>, start of first granularity period 7 Sep. 2005, 10:30 local, end of last granularity period 9 Sep. 2005, 15:00 local, with a time differential of 0 against UTC.

Figure 13:
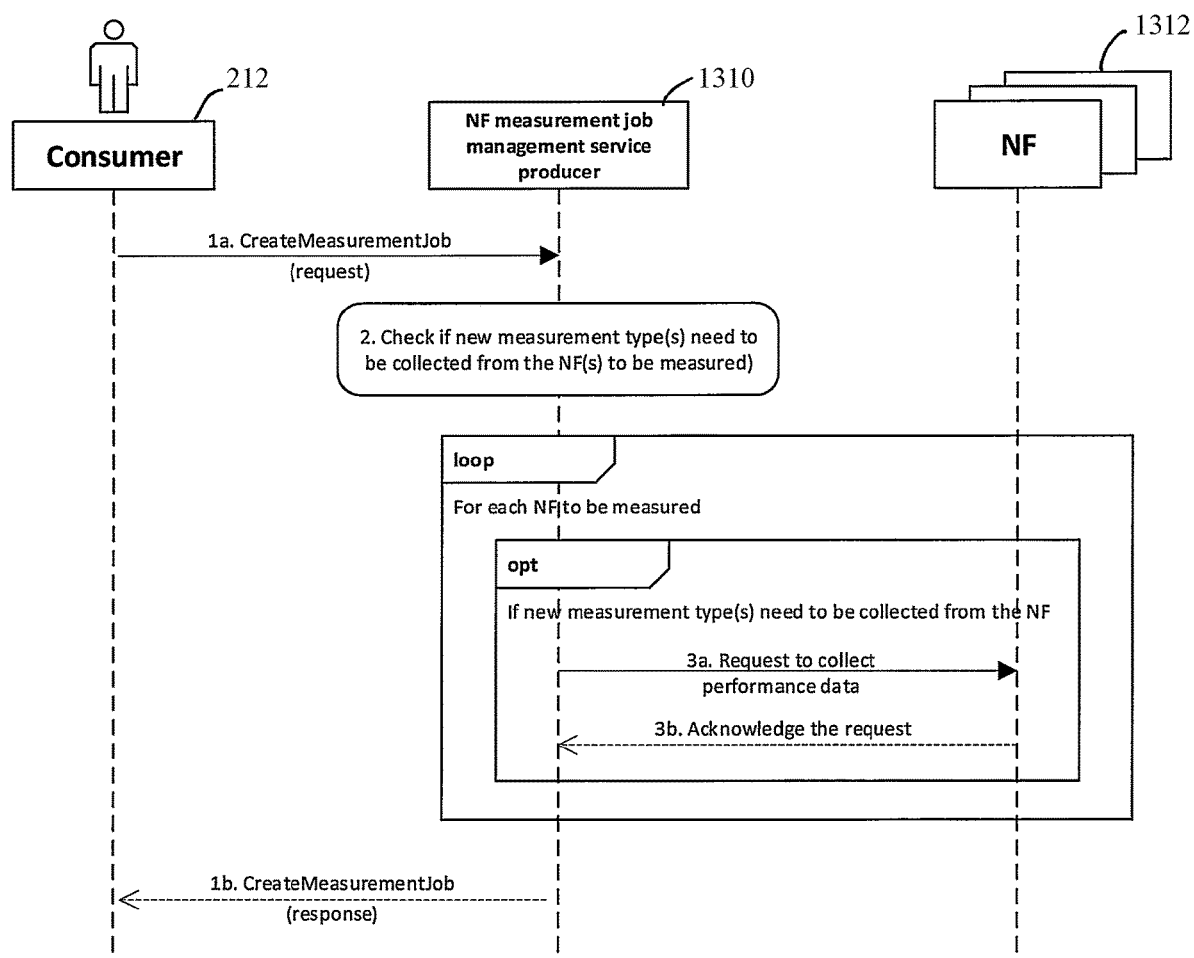
FIG. 13 is a diagram of an example procedure for NF measurement job creation in accordance with one or more embodiments.

FIG. 13 is a diagram of an example procedure for NF measurement job creation in accordance with one or more embodiments will be discussed. FIG. 13 illustrates an example of procedure for creating a measurement job for network functions (NFs). At operation 1a, the authorized consumer 212 invokes the CreateMeasurementJob operation to NF measurement job management service producer to request creation of a measurement job for one or more NFs 1312. At operation 2, the NF measurement job management service producer 1310 checks if new measurement type(s) need to be collected from the NF(s) 1312 to be measured. At operation 3, for each NF to be measured, if new measurements type(s) need to be collected, at operation 3a the NF measurement job management service producer 1310 requests NF to collect the performance data, and at operation 3b. the NF measurement job management service producer 1310 receives the acknowledgement of the request from the NF 1312. At operation 1b, the NF measurement job management service producer 1310 returns the result of CreateMeasurementJob operation (see clause 5.1.1) to the consumer 212. If the NF measurement job is successfully created, the NF measurement job management service producer will collect the performance data from the NF(s) accordingly, and make the measurement results available to the NF performance data reporting service producer for each reporting period.

Figure 14:
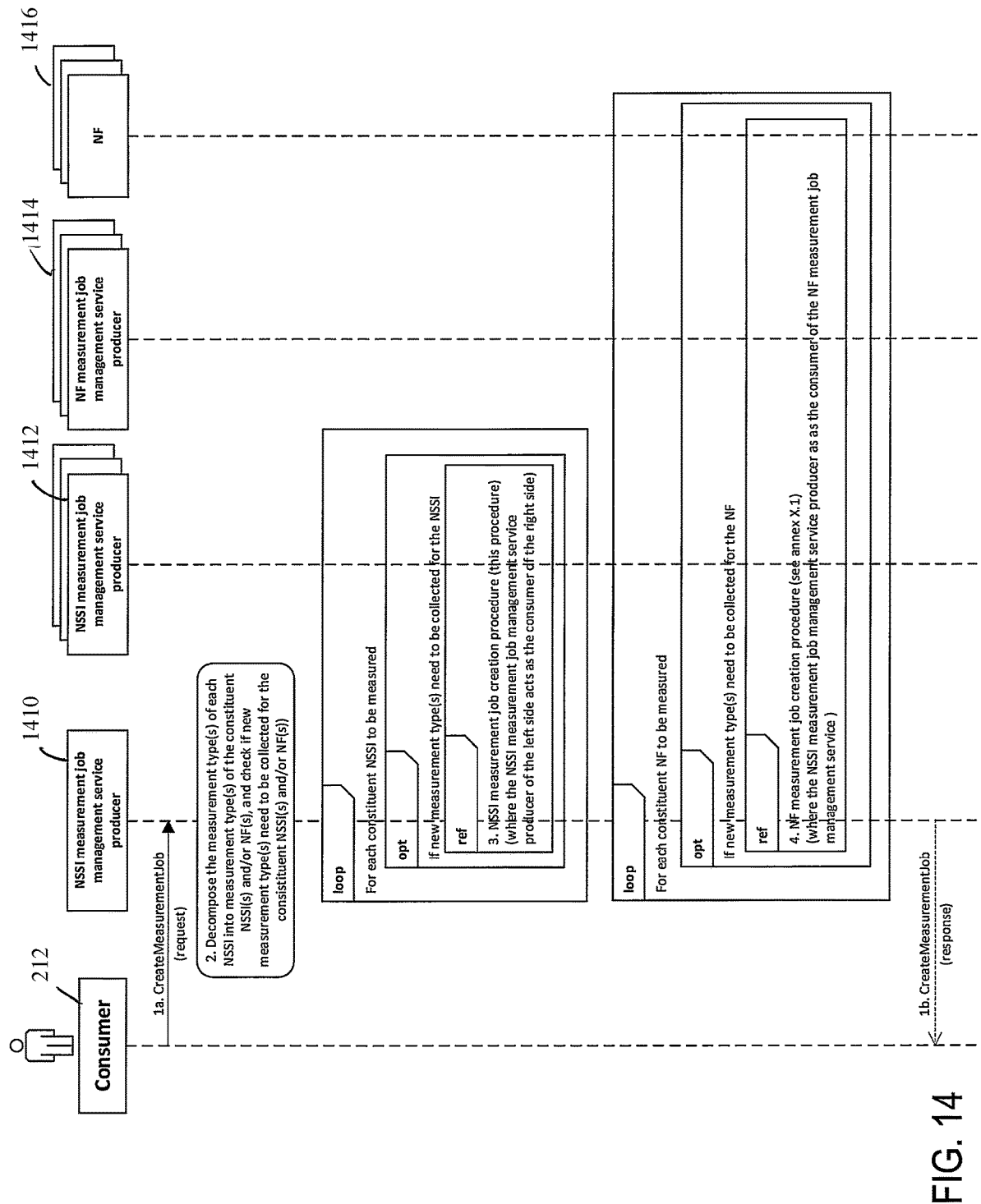
FIG. 14 is a diagram of an example procedure for NSSI measurement job creation in accordance with one or more embodiments.

FIG. 14 is a diagram of an example procedure for NSSI measurement job creation in accordance with one or more embodiments will be discussed. FIG. 14 shows the procedure for creating a measurement job for one or more network slice subnet instances (NSSIs). At operation 1a. the authorized consumer 212 invokes the CreateMeasurementJob operation to NSSI measurement job management service producer 1410 to request creation of a measurement job for NSSI(s). At operation 2, the NSSI measurement job management service producer 1410 decomposes the measurement type(s) of each NSSI to the measurement type(s) of the constituent NSSI(s) and/or NF(s), and checks if new measurement type(s) need to be collected for the constituent NSSI(s) and/or NF(s). At operation 3, for each constituent NSSI to be measured, if new measurements type(s) need to be collected, the NSSI measurement job management service producer 1410 acts as consumer of another NSSI measurement job management service instance 1412, and requests the corresponding NSSI measurement job management service producer to request creation of measurement job for the NSSI following the same procedure as illustrated in FIG. 14. It is also possible to create one measurement job to collect the performance data for multiple NSSI(s).

At operation 4, for each constituent NF 1416 to be measured, if new measurements type(s) need to be collected, the NSSI measurement job management service producer 1412 acts as consumer of NF measurement job management service producer 1414, and requests the corresponding NF measurement job management service producer 1414 to request creation of measurement job for the NF 1416 according to the NF measurement job creation procedure as illustrated. It is also possible to create one measurement job to collect the performance data for multiple NF(s) 1416. At operation 1b, the NSSI measurement job management service producer 1410 returns the result of CreateMeasurementJob operation to the consumer If the NSSI measurement job is successfully created, the NSSI measurement job management service producer 1410 will collect the performance data for the constituent NSSI(s) and/or NF(s) accordingly, generate the measurement results for the measured NSSI(s), and make the measurement results available to the NSSI performance data reporting service producer for each reporting period.

Figure 15:
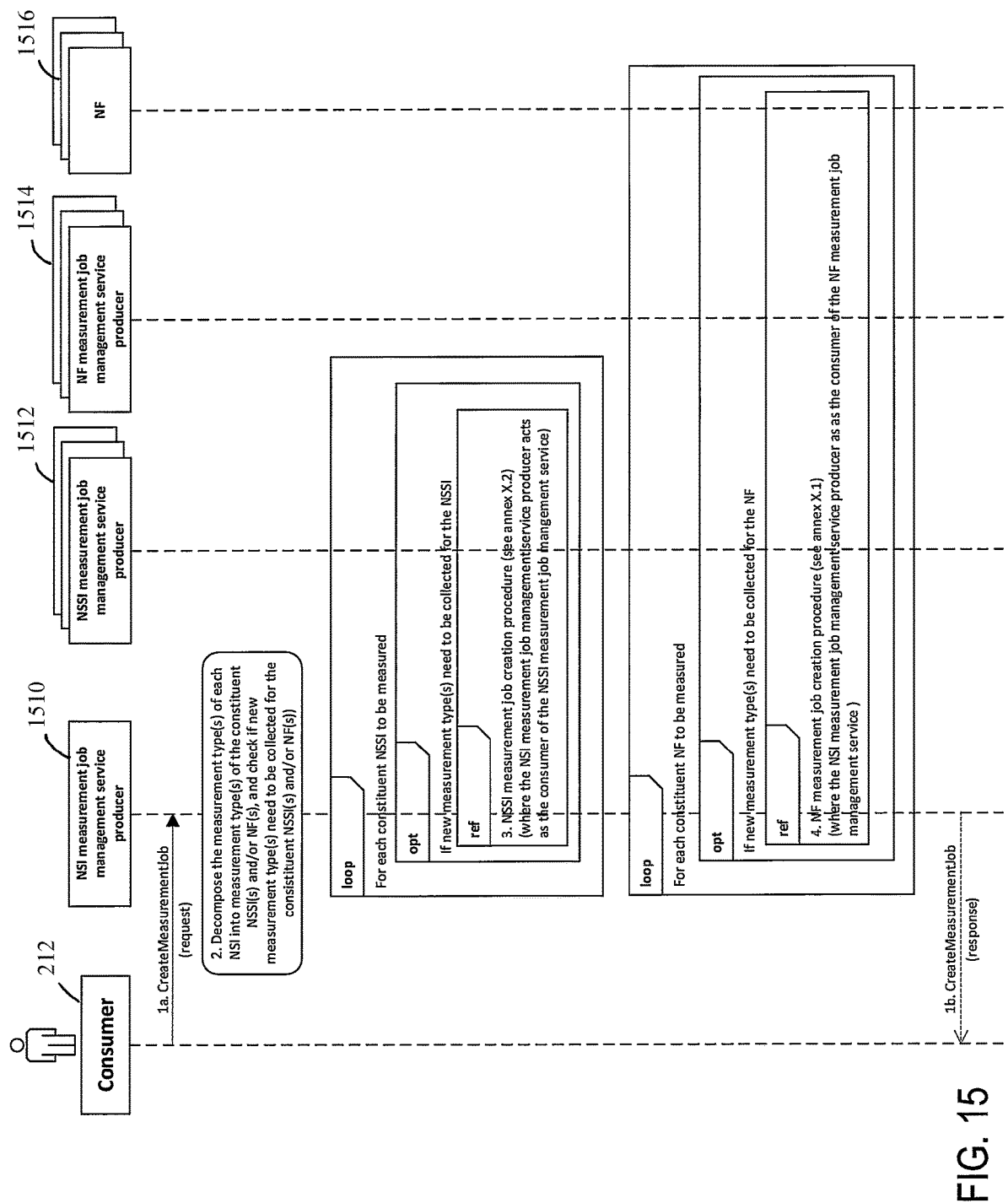
FIG. 15 is a diagram of an example procedure of NSI measurement job creation in accordance with one or more embodiments.

FIG. 15 is a diagram of an example procedure of NSI measurement job creation in accordance with one or more embodiments will be discussed. FIG. 15 illustrates an example of procedure for creating a measurement job for one or more network slice instances (NSIs). At operation 1a, the authorized consumer invokes the CreateMeasurementJob operation to NSI measurement job management service producer 1510 to request creation of a measurement job for one or more NSI(s). At operation 2, the NSI measurement job management service producer 1510 decomposes the measurement type(s) of each NSI to the measurement type(s) of the constituent NSSI(s) and/or NF(s), and checks if new measurement type(s) need to be collected for the constituent NSSI(s) and/or NF(s). At operation 3, for each constituent NSSI to be measured, if new measurements type(s) need to be collected, the NSI measurement job management service producer 1512 acts as consumer of the NSSI measurement job management service 1514, and requests the corresponding NSSI measurement job management service producer 1514 to request creation of measurement job for the NSSI. It is also possible to create one measurement job to collect the performance data for multiple NSSI(s).

At operation 4, for each constituent NF 1516 to be measured, if new measurements type(s) need to be collected, the NSI measurement job management service producer 1510 acts as consumer of NF measurement job management service, and requests the corresponding NF measurement job management service producer 1514 to request creation of measurement job for the NF according to the NF measurement job creation procedure. It is also possible to create one measurement job to collect the performance data for multiple NF(s) 1516. At operation 1b, the NSI measurement job management service producer 1510 returns the result of CreateMeasurementJob operation to the consumer 212. If the NSI measurement job is successfully created, the NSI measurement job management service producer 1510 will collect the performance data for the constituent NSSI(s) and/or NF(s) accordingly, generate the measurement results for the measured NSI(s) and make the measurement results available to the NSI performance data reporting service producer for each reporting period.

Figure 16:
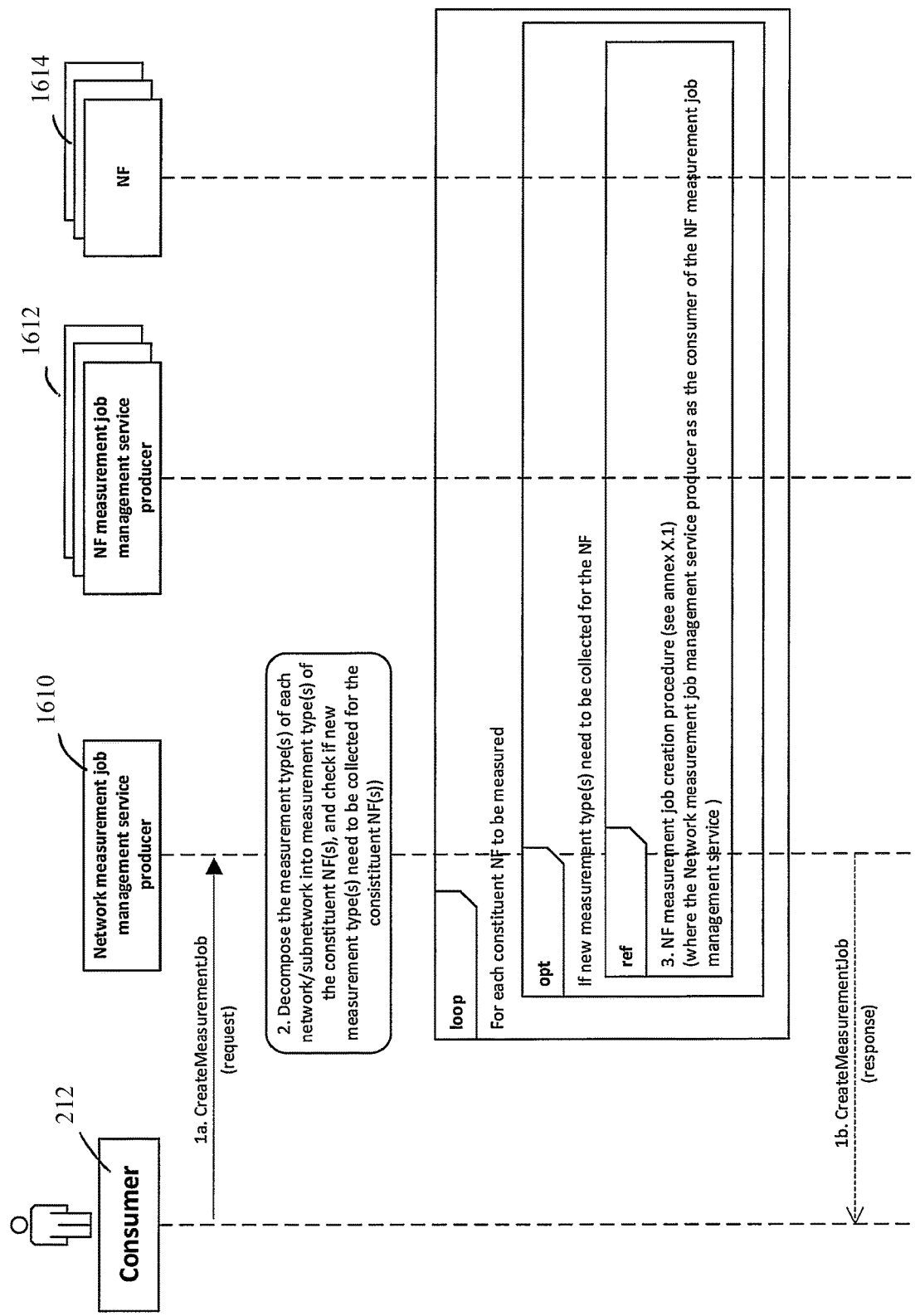
FIG. 16 is a diagram of an example procedure for network measurement job creation in accordance with one or more embodiments.

FIG. 16 is a diagram of an example procedure for network measurement job creation in accordance with one or more embodiments will be discussed. FIG. 16 shows the procedure for creating a measurement job for network and/or one or more subnetworks. At operation 1a, the authorized consumer invokes the CreateMeasurementJob operation to network measurement job management service producer 1610 to request creation of a measurement job for a network and/or one or more subnetworks.

At operation 2, the network measurement job management service producer 1610 decomposes the measurement type(s) of each network/subnetwork to the measurement type(s) of the constituent NF(s) 1614, and checks if new measurement type(s) need to be collected for the constituent NF(s) 1614. At operation 3, for each constituent NF 1614 to be measured, if new measurements type(s) need to be collected, the network measurement job management service producer 1610 acts as consumer of NF measurement job management service 1612, and requests the corresponding NF measurement job management service producer 1612 to request creation of measurement job for the NF according to the NF measurement job creation procedure. It is also possible to create one measurement job to collect the performance data for multiple NF(s) 1614.

At operation 1b, the network measurement job management service producer 1610 returns the result of CreateMeasurementJob operation to the consumer 1614. If the network measurement job is successfully created, the network measurement job management service producer 1610 will collect the performance data for the constituent NF(s) 1614 accordingly, generate the measurement results for the measured network/subnetwork(s) and make the measurement results available to the network performance data reporting service producer for each reporting period.

Figure 17:
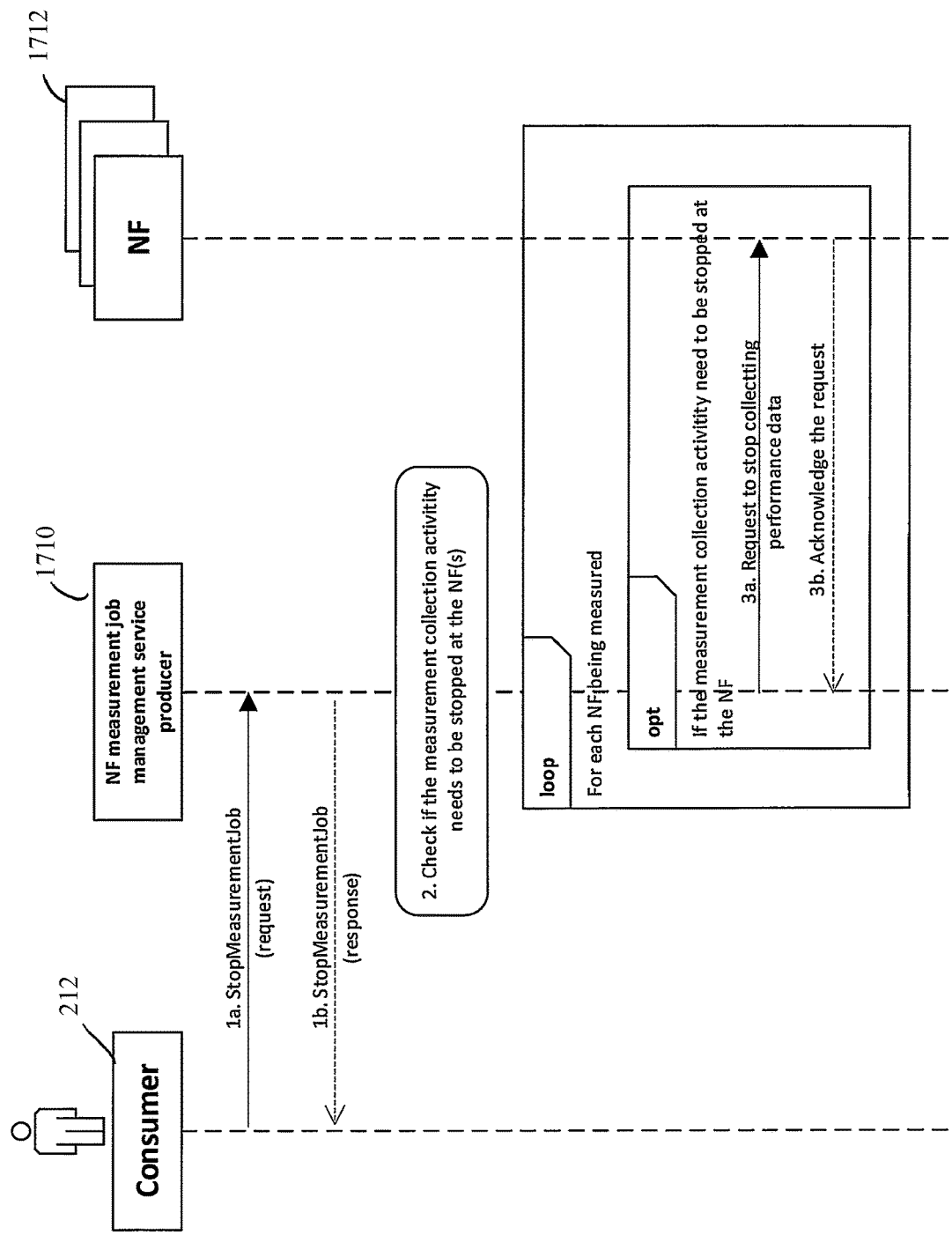
FIG. 17 is a diagram of an example procedure for NF measurement job termination in accordance with one or more embodiments.

FIG. 17 is a diagram of an example procedure for NF measurement job termination in accordance with one or more embodiments will be discussed. FIG. 17 shows a procedure for stopping a measurement job for one or more network functions (NFs) 1712. At operation 1a, the authorized consumer 212 invokes the StopMeasurementJob operation to NF measurement job management service producer 1710 to request termination of a measurement job for one or more NFs 1712. At operation 1b, the NF measurement job management service producer 1710 returns the result of StopMeasurementJob operation to the consumer 212. At operation 2, the NF measurement job management service producer 1710 checks if the measurement collection activity needs to be stopped at the NFs 1712. At operation 3, for each NF 1712 being measured, if the measurement collection activity needs to be stopped at the NF(s) 1712, then at operation 3a, the NF measurement job management service producer 1710 requests NF to stop collecting the performance data, and at operation 3b, the NF measurement job management service producer 1710 receives the acknowledgement of the request from NF 1712.

Figure 18:
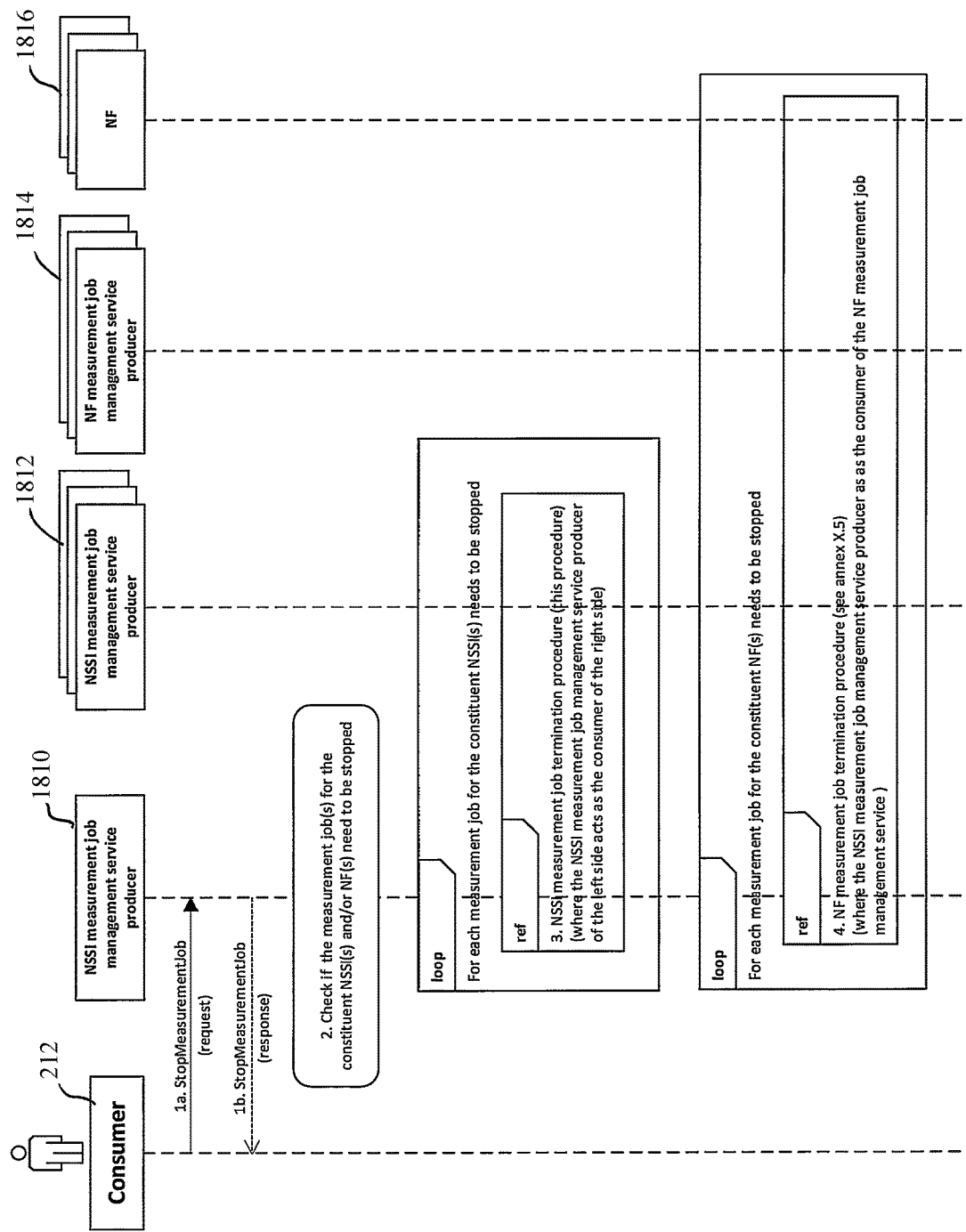
FIG. 18 is a diagram of an example procedure for NSSI measurement job termination in accordance with one or more embodiments.

FIG. 18 is a diagram of an example procedure for NSSI measurement job termination in accordance with one or more embodiments will be discussed. FIG. 18 shows a procedure for stopping a measurement job for one or more network slice subnet instances (NSSIs). At operation 1a, the authorized consumer 212 invokes the StopMeasurementJob operation to NSSI measurement job management service producer 1810 to request termination of a measurement job for one or more NSSIs. At operation 1b, the NSSI measurement job management service producer 1810 returns the result of StopMeasurementJob operation to the consumer 212. At operation 2, the NSSI measurement job management service producer 1810 checks if the measurement job(s) for the constituent NSSI(s) and/or NF(s) need to be stopped.

At operation 3, for each measurement job for the constituent NSSI(s) that needs to be stopped, the NSSI measurement job management service producer 1810 acts as consumer of another NSSI measurement job management service producer instance 1812, and requests the corresponding NSSI measurement job management service producer 1812 to terminate the measurement job for the constituent NSSI(s) following the same procedure as illustrated in FIG. 18.

4. For each measurement job for the constituent NF(s) 1816 that needs to be stopped, the NSSI measurement job management service producer 1812 acts as consumer of NF measurement job management service, and requests the corresponding NF measurement job management service producer 1814 to terminate the measurement job for the NF(s) 1816 according to the NF measurement job termination procedure.

Figure 19:
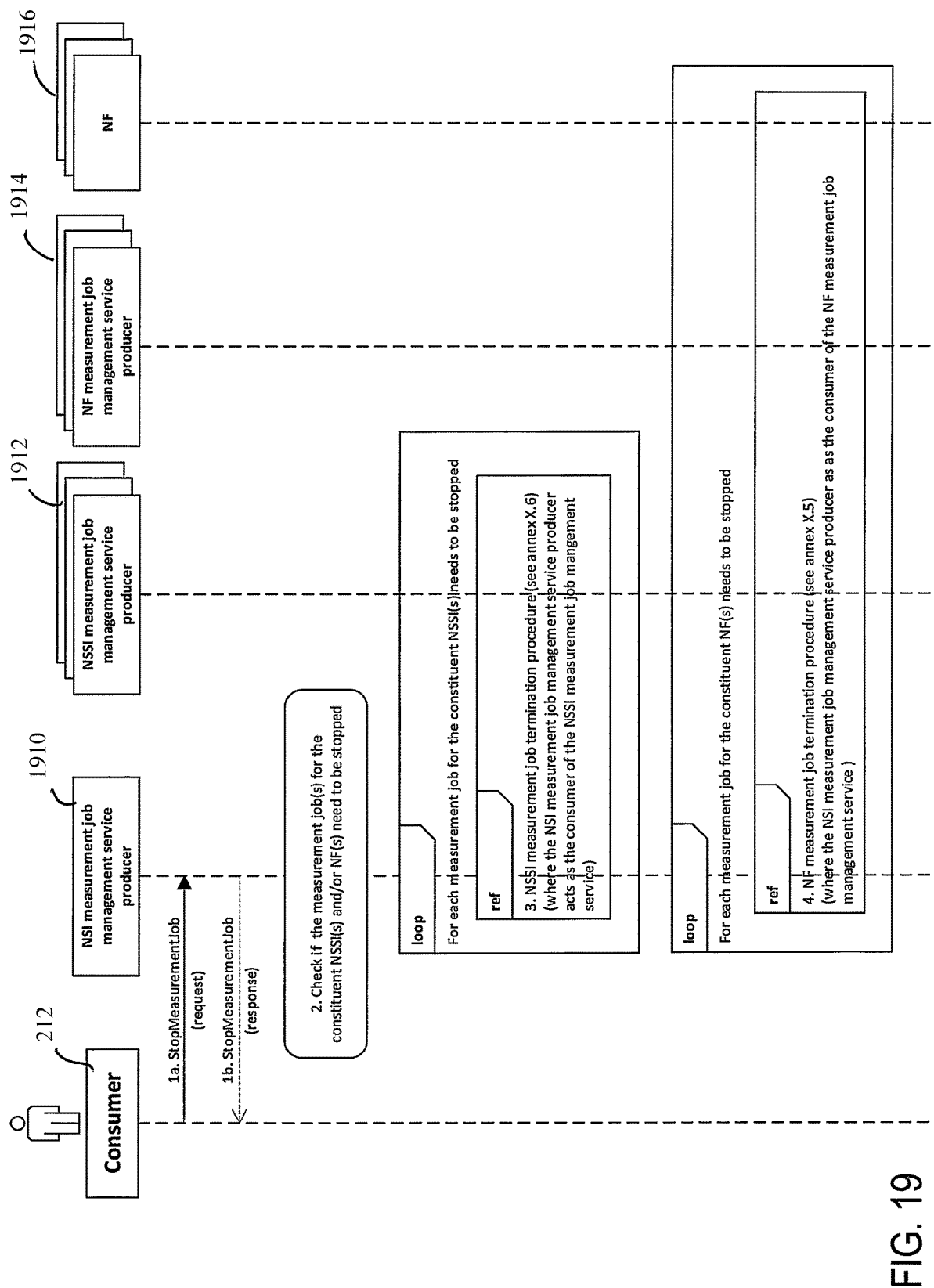
FIG. 19 is a diagram of an example procedure for NSI measurement job termination in accordance with one or more embodiments.

Referring now to FIG. 19, a diagram of an example procedure for NSI measurement job termination in accordance with one or more embodiments will be discussed. FIG. 19 shows an example procedure for stopping a measurement job for one or more network slice instances (NSIs). At operation 1*a*, the authorized consumer 212 invokes the StopMeasurementJob operation to NSI measurement job management service producer 1910 to request creation of a measurement job for one or more NSIs. At operation 1*b*, the NSI measurement job management service producer 1910 returns the result of StopMeasurementJob operation to the consumer 212. At operation 2, the NSI measurement job management service producer 1910 checks if the measurement job(s) for the constituent NSSI(s) and/or NF(s) need to be stopped.

At operation 3, for each measurement job for the constituent NSSI(s) needs to be stopped, the NSI measurement job management service producer 1910 acts as consumer of the NSSI measurement job management service, and requests the corresponding NSSI measurement job management service producer 1912 to terminate the measurement job for the constituent NSSI(s) according to the NSSI measurement job termination procedure. At operation 4, for each measurement job for the constituent NF(s) 1916 that needs to be stopped, the NSI measurement job management service producer 1912 acts as consumer of NF measurement job management service, and requests the corresponding NF measurement job management service producer 1914 to terminate the measurement job for the NF(s) 1916 according to the NF measurement job termination procedure.

Figure 20:
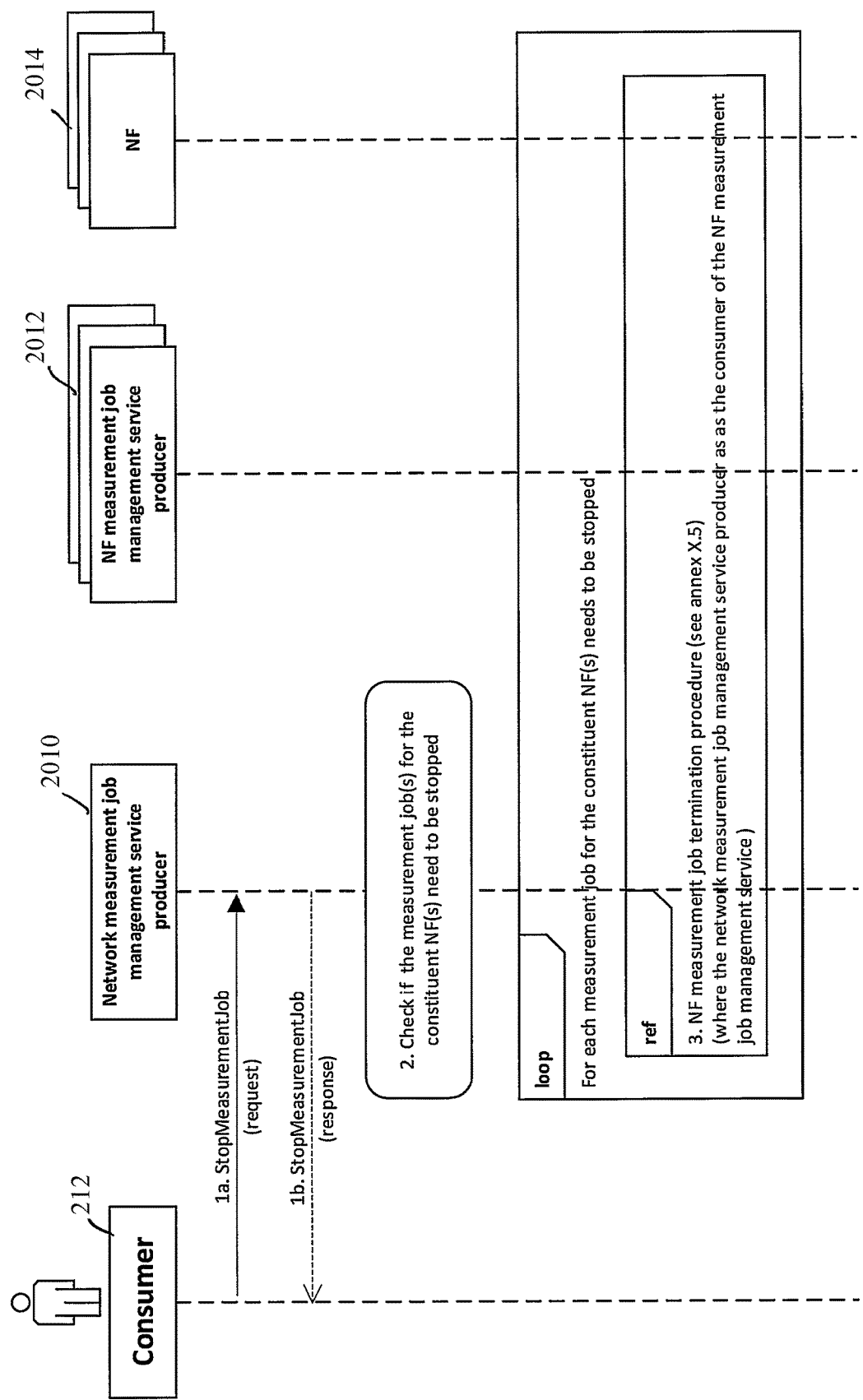
FIG. 20 is a diagram of an example procedure for network measurement job termination in accordance with one or more embodiments.

Referring now to FIG. 20, a diagram of an example procedure for network measurement job termination in accordance with one or more embodiments will be discussed. FIG. 20 shows a procedure for stopping a measurement job for a network and/or one or more subnetworks. At operation 1*b*, the authorized consumer 212 invokes the StopMeasurementJob operation to network measurement job management service producer 2010 to request termination of a measurement job for one or more network and/or subnetworks. At operation 1*b*, the network measurement job management service producer 2010 returns the result of StopMeasurementJob operation to the consumer 212. At operation 2, the network measurement job management service producer 2010 checks if the measurement job(s) for the constituent NF(s) 2104 need to be stopped. At operation 3, for each measurement job for the constituent NF(s) 2014 that needs to be stopped, the network measurement job management service producer 2010 acts as consumer of NF measurement job management service, and requests the corresponding NF measurement job management service producer 2012 to terminate the measurement job for the NF(s) 2014 according to the NF measurement job termination procedure.

FIG. 21 illustrates an architecture of a system 2100 of a network in accordance with some embodiments. The system 2100 is shown to include a user equipment (UE) 2101 and a UE 2102. The UEs 2101 and 2102 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 2101 and 2102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2101 and 2102 may be configured to connect, e.g., communicatively couple, with a radio access network (RAN) 2110—the RAN 2110 may be, for example, an Evolved Universal Mobile Telecommunications System (UMTS) Terrestrial Radio Access Network (E-UTRAN), a NextGen RAN (NG RAN), or some other type of RAN. The UEs 2101 and 2102 utilize connections 2103 and 2104, respectively, each of which comprises a physical communications interface or layer (discussed in further detail below); in this example, the connections 2103 and 2104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 2101 and 2102 may further directly exchange communication data via a ProSe interface 2105. The ProSe interface 2105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 2102 is shown to be configured to access an access point (AP) 2106 via connection 2107. The connection 2107 can comprise a local wireless connection, such as a connection consistent with any IEEE 802.11 protocol, wherein the AP 2106 would comprise a wireless fidelity (WiFi®) router. In this example, the AP 2106 is shown to be connected to the Internet without connecting to the core network of the wireless system (described in further detail below).

The RAN 2110 can include one or more access nodes that enable the connections 2103 and 2104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 2110 may include one or more RAN nodes for providing macrocells, e.g., macro RAN node 2111, and one or more RAN nodes for providing femtocells or picocells (e.g., cells having smaller coverage areas, smaller user capacity, or higher bandwidth compared to macrocells), e.g., low power (LP) RAN node 2112.

Any of the RAN nodes 2111 and 2112 can terminate the air interface protocol and can be the first point of contact for the UEs 2101 and 2102. In some embodiments, any of the RAN nodes 2111 and 2112 can fulfill various logical functions for the RAN 2110 including, but not limited to, radio network controller (RNC) functions such as radio bearer management, uplink and downlink dynamic radio resource management and data packet scheduling, and mobility management.

In accordance with some embodiments, the UEs 2101 and 2102 can be configured to communicate using Orthogonal Frequency-Division Multiplexing (OFDM) communication signals with each other or with any of the RAN nodes 2111 and 2112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 2111 and 2112 to the UEs 2101 and 2102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 2101 and 2102. The physical downlink control channel (PDCCH) may carry information about the transport format and resource allocations related to the PDSCH channel, among other things. It may also inform the UEs 2101 and 2102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 2111 and 2112 based on channel quality information fed back from any of the UEs 2101 and 2102. The downlink resource assignment information may be sent on the PDCCH used for (e.g., assigned to) each of the UEs 2101 and 2102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 2110 is shown to be communicatively coupled to a core network (CN) 2120—via an S1 interface 2113. In embodiments, the CN 2120 may be an evolved packet core (EPC) network, a NextGen Packet Core (NPC) network, or some other type of CN. In this embodiment the S1 interface 2113 is split into two parts: the S1-U interface 2114, which carries traffic data between the RAN nodes 2111 and 2112 and the serving gateway (S-GW) 2122, and the S1-mobility management entity (MME) interface 2115, which is a signaling interface between the RAN nodes 2111 and 2112 and MMEs 2121.

In this embodiment, the CN 2120 comprises the MMEs 2121, the S-GW 2122, the Packet Data Network (PDN) Gateway (P-GW) 2123, and a home subscriber server (HSS) 2124. The MMEs 2121 may be similar in function to the control plane of legacy Serving General Packet Radio Service (GPRS) Support Nodes (SGSN). The MMEs 2121 may manage mobility aspects in access such as gateway selection and tracking area list management. The HSS 2124 may comprise a database for network users, including subscription-related information to support the network entities' handling of communication sessions. The CN 2120 may comprise one or several HSSs 2124, depending on the number of mobile subscribers, on the capacity of the equipment, on the organization of the network, etc. For example, the HSS 2124 can provide support for routing/roaming, authentication, authorization, naming/addressing resolution, location dependencies, etc.

The S-GW 2122 may terminate the S1 interface 2113 towards the RAN 2110, and routes data packets between the RAN 2110 and the CN 2120. In addition, the S-GW 2122 may be a local mobility anchor point for inter-RAN node handovers and also may provide an anchor for inter-3GPP mobility. Other responsibilities may include lawful intercept, charging, and some policy enforcement.

The P-GW 2123 may terminate an SGi interface toward a PDN. The P-GW 2123 may route data packets between the EPC network 2123 and external networks such as a network including the application server 2130 (alternatively referred to as application function (AF)) via an Internet Protocol (IP) interface 2125. Generally, the application server 2130 may be an element offering applications that use IP bearer resources with the core network (e.g., UMTS Packet Services (PS) domain, LTE PS data services, etc.). In this embodiment, the P-GW 2123 is shown to be communicatively coupled to an application server 2130 via an IP communications interface 2125. The application server 2130 can also be configured to support one or more communication services (e.g., Voice-over-Internet Protocol (VoIP) sessions, PTT sessions, group communication sessions, social networking services, etc.) for the UEs 2101 and 2102 via the CN 2120.

The P-GW 2123 may further be a node for policy enforcement and charging data collection. Policy and Charging Enforcement Function (PCRF) 2126 is the policy and charging control element of the CN 2120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 2126 may be communicatively coupled to the application server 2130 via the P-GW 2123. The application server 2130 may signal the PCRF 2126 to indicate a new service flow and select the appropriate Quality of Service (QoS) and charging parameters. The PCRF 2126 may provision this rule into a Policy and Charging Enforcement Function (PCEF) (not shown) with the appropriate traffic flow template (TFT) and QoS class of identifier (QCI), which commences the QoS and charging as specified by the application server 2130.

FIG. 22 illustrates example components of a device 2200 in accordance with some embodiments. In some embodiments, the device 2200 may include application circuitry 2202, baseband circuitry 2204, Radio Frequency (RF) circuitry 2206, front-end module (FEM) circuitry 2208, one or more antennas 2210, and power management circuitry (PMC) 2212 coupled together at least as shown. The components of the illustrated device 2200 may be included in a UE or a RAN node. In some embodiments, the device 2200 may include less elements (e.g., a RAN node may not utilize application circuitry 2202, and instead include a processor/controller to process IP data received from an EPC). In some embodiments, the device 2200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2202 may include one or more application processors. For example, the application circuitry 2202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2200. In some embodiments, processors of application circuitry 2202 may process IP data packets received from an EPC.

The baseband circuitry 2204 may include circuitry such as, but not limited to, one or more single-core or multi-core processors. The baseband circuitry 2204 may include one or more baseband processors or control logic to process baseband signals received from a receive signal path of the RF circuitry 2206 and to generate baseband signals for a transmit signal path of the RF circuitry 2206. Baseband processing circuitry 2204 may interface with the application circuitry 2202 for generation and processing of the baseband signals and for controlling operations of the RF circuitry 2206. For example, in some embodiments, the baseband circuitry 2204 may include a third generation (3G) baseband processor 2204A, a fourth generation (4G) baseband processor 2204B, a fifth generation (5G) baseband processor 2204C, or other baseband processor(s) 2204D for other existing generations, generations in development or to be developed in the future (e.g., second generation (2G), sixth generation (6G), etc.). The baseband circuitry 2204 (e.g., one or more of baseband processors 2204A-D) may handle various radio control functions that enable communication with one or more radio networks via the RF circuitry 2206. In other embodiments, some or all of the functionality of baseband processors 2204A-D may be included in modules stored in the memory 2204G and executed via a Central Processing Unit (CPU) 2204E. The radio control functions may include, but are not limited to, signal modulation/demodulation, encoding/decoding, radio frequency shifting, etc. In some embodiments, modulation/demodulation circuitry of the baseband circuitry 2204 may include Fast-Fourier Transform (FFT), precoding, or constellation mapping/demapping functionality. In some embodiments, encoding/decoding circuitry of the baseband circuitry 2204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2204 may include one or more audio digital signal processor(s) (DSP) 2204F. The audio DSP(s) 2204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2204 and the application circuitry 2202 may be implemented together such as, for example, on a system on a chip (SOC).

In some embodiments, the baseband circuitry 2204 may provide for communication compatible with one or more radio technologies. For example, in some embodiments, the baseband circuitry 2204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 2204 is configured to support radio communications of more than one wireless protocol may be referred to as multi-mode baseband circuitry.

RF circuitry 2206 may enable communication with wireless networks using modulated electromagnetic radiation through a non-solid medium. In various embodiments, the RF circuitry 2206 may include switches, filters, amplifiers, etc. to facilitate the communication with the wireless network. RF circuitry 2206 may include a receive signal path which may include circuitry to down-convert RF signals received from the FEM circuitry 2208 and provide baseband signals to the baseband circuitry 2204. RF circuitry 2206 may also include a transmit signal path which may include circuitry to up-convert baseband signals provided by the baseband circuitry 2204 and provide RF output signals to the FEM circuitry 2208 for transmission.

In some embodiments, the receive signal path of the RF circuitry 2206 may include mixer circuitry 2206a, amplifier circuitry 2206b and filter circuitry 2206c. In some embodiments, the transmit signal path of the RF circuitry 2206 may include filter circuitry 2206c and mixer circuitry 2206a. RF circuitry 2206 may also include synthesizer circuitry 2206d for synthesizing a frequency for use by the mixer circuitry 2206a of the receive signal path and the transmit signal path. In some embodiments, the mixer circuitry 2206a of the receive signal path may be configured to down-convert RF signals received from the FEM circuitry 2208 based on the synthesized frequency provided by synthesizer circuitry 2206d. The amplifier circuitry 2206b may be configured to amplify the down-converted signals and the filter circuitry 2206c may be a low-pass filter (LPF) or band-pass filter (BPF) configured to remove unwanted signals from the down-converted signals to generate output baseband signals. Output baseband signals may be provided to the baseband circuitry 2204 for further processing. In some embodiments, the output baseband signals may be zero-frequency baseband signals, although this is not a requirement. In some embodiments, mixer circuitry 2206a of the receive signal path may comprise passive mixers, although the scope of the embodiments is not limited in this respect.

In some embodiments, the mixer circuitry 2206a of the transmit signal path may be configured to up-convert input baseband signals based on the synthesized frequency provided by the synthesizer circuitry 2206d to generate RF output signals for the FEM circuitry 2208. The baseband signals may be provided by the baseband circuitry 2204 and may be filtered by filter circuitry 2206c.

In some embodiments, the mixer circuitry 2206a of the receive signal path and the mixer circuitry 2206a of the transmit signal path may include two or more mixers and may be arranged for quadrature downconversion and upconversion, respectively. In some embodiments, the mixer circuitry 2206a of the receive signal path and the mixer circuitry 2206a of the transmit signal path may include two or more mixers and may be arranged for image rejection (e.g., Hartley image rejection). In some embodiments, the mixer circuitry 2206a of the receive signal path and the mixer circuitry 2206a may be arranged for direct downconversion and direct upconversion, respectively. In some embodiments, the mixer circuitry 2206a of the receive signal path and the mixer circuitry 2206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2206 may include analog-to-digital converter (ADC) and digital-to-analog converter (DAC) circuitry and the baseband circuitry 2204 may include a digital baseband interface to communicate with the RF circuitry 2206.

In some dual-mode embodiments, a separate radio IC circuitry may be provided for processing signals for each spectrum, although the scope of the embodiments is not limited in this respect. In some embodiments, the synthesizer circuitry 2206d may be a fractional-N synthesizer or a fractional N/N+1 synthesizer, although the scope of the embodiments is not limited in this respect as other types of frequency synthesizers may be suitable. For example, synthesizer circuitry 2206d may be a delta-sigma synthesizer, a frequency multiplier, or a synthesizer comprising a phase-locked loop with a frequency divider.

The synthesizer circuitry 2206d may be configured to synthesize an output frequency for use by the mixer circuitry 2206a of the RF circuitry 2206 based on a frequency input and a divider control input. In some embodiments, the synthesizer circuitry 2206d may be a fractional N/N+1 synthesizer.

In some embodiments, frequency input may be provided by a voltage-controlled oscillator (VCO), although that is not a requirement. Divider control input may be provided by either the baseband circuitry 2204 or the applications processor 2202 depending on the desired output frequency. In some embodiments, a divider control input (e.g., N) may be determined from a look-up table based on a channel indicated by the applications processor 2202.

Synthesizer circuitry 2206d of the RF circuitry 2206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2206 may include an IQ/polar converter.

FEM circuitry 2208 may include a receive signal path which may include circuitry configured to operate on RF signals received from one or more antennas 2210, amplify the received signals and provide the amplified versions of the received signals to the RF circuitry 2206 for further processing. FEM circuitry 2208 may also include a transmit signal path which may include circuitry configured to amplify signals for transmission provided by the RF circuitry 2206 for transmission by one or more of the one or more antennas 2210. In various embodiments, the amplification through the transmit or receive signal paths may be done solely in the RF circuitry 2206, solely in the FEM 2208, or in both the RF circuitry 2206 and the FEM 2208.

In some embodiments, the FEM circuitry 2208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 2206). The transmit signal path of the FEM circuitry 2208 may include a power amplifier (PA) to amplify input RF signals (e.g., provided by RF circuitry 2206), and one or more filters to generate RF signals for subsequent transmission (e.g., by one or more of the one or more antennas 2210).

In some embodiments, the PMC 2212 may manage power provided to the baseband circuitry 2204. In particular, the PMC 2212 may control power-source selection, voltage scaling, battery charging, or DC-to-DC conversion. The PMC 2212 may often be included when the device 2200 is capable of being powered by a battery, for example, when the device is included in a UE. The PMC 2212 may increase the power conversion efficiency while providing desirable implementation size and heat dissipation characteristics.

While FIG. 22 shows the PMC 2212 coupled only with the baseband circuitry 2204. However, in other embodiments, the PMC 2212 may be additionally or alternatively coupled with, and perform similar power management operations for, other components such as, but not limited to, application circuitry 2202, RF circuitry 2206, or FEM 2208.

In some embodiments, the PMC 2212 may control, or otherwise be part of, various power saving mechanisms of the device 2200. For example, if the device 2200 is in an RRC_Connected state, where it is still connected to the RAN node as it expects to receive traffic shortly, then it may enter a state known as Discontinuous Reception Mode (DRX) after a period of inactivity. During this state, the device 2200 may power down for brief intervals of time and thus save power.

If there is no data traffic activity for an extended period of time, then the device 2200 may transition off to an RRC_Idle state, where it disconnects from the network and does not perform operations such as channel quality feedback, handover, etc. The device 2200 goes into a very low power state and it performs paging where again it periodically wakes up to listen to the network and then powers down again. The device 2200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2202 and processors of the baseband circuitry 2204 may be used to execute elements of one or more instances of a protocol stack. For example, processors of the baseband circuitry 2204, alone or in combination, may be used execute Layer 3, Layer 2, or Layer 1 functionality, while processors of the application circuitry 2204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

FIG. 23 illustrates example interfaces of baseband circuitry in accordance with some embodiments. As discussed above, the baseband circuitry 2204 of FIG. 22 may comprise processors 2204A-2204E and a memory 2204G utilized by said processors. Each of the processors 2204A-2204E may include a memory interface, 2304A-2304E, respectively, to send/receive data to/from the memory 2204G.

The baseband circuitry 2204 may further include one or more interfaces to communicatively couple to other circuitries/devices, such as a memory interface 2312 (e.g., an interface to send/receive data to/from memory external to the baseband circuitry 2204), an application circuitry interface 2314 (e.g., an interface to send/receive data to/from the application circuitry 2202 of FIG. 22), an RF circuitry interface 2316 (e.g., an interface to send/receive data to/from RF circuitry 2206 of FIG. 22), a wireless hardware connectivity interface 2318 (e.g., an interface to send/receive data to/from Near Field Communication (NFC) components, Bluetooth® components (e.g., Bluetooth® Low Energy), Wi-Fi® components, and other communication components), and a power management interface 2320 (e.g., an interface to send/receive power or control signals to/from the PMC 2212.

Although the claimed subject matter has been described with a certain degree of particularity, it should be recognized that elements thereof may be altered by persons skilled in the art without departing from the spirit and/or scope of claimed subject matter. It is believed that the subject matter pertaining to operations and notifications for performance management of 5G networks and network slicing and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a management service producer comprising:
 one or more processors configured to perform operations comprising:
  receiving a CreateMeasurementJob operation request from a consumer to create a measurement job for a network function (NF), wherein the measurement job is to collect a value for one or more measurement types, the one or more measurement types comprising performance measurements to be collected from the NF;
  returning a result of the performance measurements to the consumer; and
  rejecting another measurement job creation request to collect a same measurement type as the CreateMeasurementJob operation request with a different granularity period than the CreateMeasurementJob operation request; and a memory to store the performance measurements.

2. The apparatus of claim 1, wherein the request from the consumer is to collect one or more measurement types of an object class.

3. The apparatus of claim 2, wherein the object class comprises an Information Object Class Name (iOCName).

4. The apparatus of claim 1, wherein the result of the performance measurements is reported to the consumer as a performance data file.

5. The apparatus of claim 1, wherein the result of the performance measurements is reported to the consumer as streaming performance data.

6. One or more non-transitory storage media having instructions stored thereon that, when executed by an apparatus of a management service producer, result in:

receiving a CreateMeasurementJob operation request from a consumer to create a measurement job for a network function (NF), wherein the measurement job is to collect a value for one or more measurement types, the one or more measurement types comprising performance measurements to be collected from the NF; and returning a result of the performance measurements to the consumer, wherein the one or more processors are to reject another measurement job creation request to collect a same measurement type as the CreateMeasurementJob operation request with a different granularity period than the CreateMeasurementJob operation request.

7. The one or more non-transitory storage media of claim 6, wherein the request from the consumer is to collect one or more measurement types of an object class.

8. The one or more non-transitory storage media of claim 7, wherein the object class comprises an Information Object Class Name (iOCName).

9. The one or more non-transitory storage media of claim 6, wherein the instructions, when executed, further result in reporting the result of the performance measurements to the consumer as a performance data file.

10. The one or more non-transitory storage media of claim 6, wherein the instructions, when executed, further result in reporting the result of the performance measurements to the consumer as streaming performance data.

* * * * *